(12) United States Patent
Chen

(10) Patent No.: US 9,057,183 B2
(45) Date of Patent: Jun. 16, 2015

(54) TOUCH FREE AUTOMATIC FAUCET

(76) Inventor: Chung-Chia Chen, La Habra Heights, CA (US)

( * ) Notice: Subject to any disclaimer, the term of this patent is extended or adjusted under 35 U.S.C. 154(b) by 1114 days.

(21) Appl. No.: 12/815,281

(22) Filed: Jun. 14, 2010

(65) Prior Publication Data

US 2011/0185493 A1 Aug. 4, 2011

Related U.S. Application Data

(60) Provisional application No. 61/300,781, filed on Feb. 2, 2010.

(51) Int. Cl.
*G05D 23/13* (2006.01)
*F16K 43/00* (2006.01)
*E03C 1/05* (2006.01)

(52) U.S. Cl.
CPC ....................................... *E03C 1/057* (2013.01)

(58) Field of Classification Search
CPC .......... E03C 1/04; E03C 1/057; F16K 19/006
USPC ...................... 236/12.12, 12.15; 606/9; 4/597; 137/15.17
See application file for complete search history.

(56) References Cited

U.S. PATENT DOCUMENTS

| | | | |
|---|---|---|---|
| D315,397 S | 3/1991 | Knapp | |
| D317,971 S | 7/1991 | Sauter et al. | |
| D352,095 S | 11/1994 | Bollenbacher | |
| 5,548,119 A | 8/1996 | Nortier | |
| 5,549,273 A | 8/1996 | Aharon | |
| 5,566,702 A | 10/1996 | Philipp | |
| 5,625,908 A | 5/1997 | Shaw | |
| 5,694,653 A | 12/1997 | Harald | |
| 5,781,942 A | 7/1998 | Allen et al. | |
| 5,868,311 A | 2/1999 | Cretu-Petra | |
| 5,966,753 A | 10/1999 | Gauthier et al. | |
| 6,019,130 A | 2/2000 | Rump | |
| 6,298,875 B1 | 10/2001 | Warshawsky et al. | |

(Continued)

FOREIGN PATENT DOCUMENTS

| CN | 2584985 | 11/2003 |
|---|---|---|
| CN | 2906258 | 5/2007 |

(Continued)

OTHER PUBLICATIONS

Notification of Transmittal of The International Search Report and The Written Opinion of the International Searching Authority (Mailing Date Nov. 22, 2010) for International Patent Application No. PCT/US2010/050146, Filed on Sep. 24, 2010.

(Continued)

*Primary Examiner* — M. Alexandra Elve
*Assistant Examiner* — Henry Crenshaw
(74) *Attorney, Agent, or Firm* — Knobbe Martens Olson & Bear, LLP

(57) ABSTRACT

A touch free automatic faucet is provided. The faucet includes a faucet housing including many sensors for controlling water flow and water temperature. A processor is connected to the sensors. A first control valve assembly is connected to the processor. A second control valve assembly is connected to the processor. A power source is connected to the processor, the first control valve assembly and the second control valve assembly. Water flow and water temperature are controlled by the sensors without touching of the faucet housing.

26 Claims, 27 Drawing Sheets

(56) References Cited

U.S. PATENT DOCUMENTS

| | | | |
|---|---|---|---|
| 6,321,785 B1 | 11/2001 | Bergmann | |
| 6,513,787 B1 | 2/2003 | Jeromson et al. | |
| 6,598,245 B2 | 7/2003 | Nishioka | |
| 6,753,554 B1 | 6/2004 | Gomes et al. | |
| 6,996,863 B2 | 2/2006 | Kaneko | |
| D516,675 S | 3/2006 | Kakihana | |
| 7,107,631 B2 | 9/2006 | Lang et al. | |
| 7,134,451 B1 | 11/2006 | Malapanes | |
| D534,622 S | 1/2007 | Chu et al. | |
| D535,366 S | 1/2007 | Sedwick | |
| 7,174,577 B2 * | 2/2007 | Jost et al. | 4/623 |
| 7,228,874 B2 * | 6/2007 | Bolderheij et al. | 137/801 |
| 7,326,334 B2 | 2/2008 | Boyd et al. | |
| D592,286 S | 5/2009 | Berberet | |
| D602,125 S | 10/2009 | Montgomery et al. | |
| 7,641,173 B2 | 1/2010 | Goodman | |
| D610,653 S | 2/2010 | Schoenherr et al. | |
| 7,766,026 B2 | 8/2010 | Boey | |
| 7,784,481 B2 | 8/2010 | Kunkel | |
| 7,946,504 B2 * | 5/2011 | Shapira et al. | 236/12.12 |
| 8,006,712 B2 * | 8/2011 | Boey | 137/15.17 |
| 8,028,355 B2 * | 10/2011 | Reeder et al. | 4/623 |
| D677,366 S | 3/2013 | Chen | |
| D677,367 S | 3/2013 | Chen | |
| 8,418,993 B2 | 4/2013 | Chen | |
| 8,438,672 B2 | 5/2013 | Reeder et al. | |
| 8,516,628 B2 | 8/2013 | Conroy | |
| D689,596 S | 9/2013 | Chen | |
| D692,110 S | 10/2013 | Chen | |
| 8,572,772 B2 | 11/2013 | Wolf et al. | |
| D698,013 S | 1/2014 | Chen | |
| D701,947 S | 4/2014 | Chen | |
| D704,311 S | 5/2014 | Chen | |
| D707,798 S | 6/2014 | Chen | |
| 8,827,239 B2 | 9/2014 | Chen | |
| 8,827,240 B2 | 9/2014 | Chen | |
| 2006/0016902 A1 | 1/2006 | Restivo et al. | |
| 2007/0057215 A1 | 3/2007 | Parsons et al. | |
| 2007/0170384 A1 | 7/2007 | Goodman | |
| 2007/0239143 A1 * | 10/2007 | Altshuler et al. | 606/9 |
| 2008/0156017 A1 * | 7/2008 | Johnson et al. | 62/320 |
| 2008/0256494 A1 | 10/2008 | Greenfield | |
| 2008/0271238 A1 * | 11/2008 | Reeder et al. | 4/597 |
| 2009/0014654 A1 * | 1/2009 | Zhevelev et al. | 250/339.02 |
| 2009/0056011 A1 | 3/2009 | Wolf et al. | |
| 2009/0119832 A1 | 5/2009 | Conroy | |
| 2009/0288712 A1 | 11/2009 | Lang et al. | |
| 2010/0108165 A1 | 5/2010 | Rodenbeck et al. | |
| 2011/0186161 A1 | 8/2011 | Chen | |
| 2012/0055557 A1 | 3/2012 | Belz et al. | |
| 2013/0233387 A1 | 9/2013 | Bedolla et al. | |
| 2013/0248617 A1 | 9/2013 | Sawaski et al. | |
| 2013/0269799 A1 | 10/2013 | Swist | |
| 2014/0261749 A1 | 9/2014 | Chen | |

FOREIGN PATENT DOCUMENTS

| | | |
|---|---|---|
| JP | 11-107339 | 4/1999 |
| JP | 2004-293207 | 10/2004 |
| JP | 2007-270538 | 10/2007 |
| WO | 2008094651 A1 | 8/2008 |

OTHER PUBLICATIONS

U.S. Office Action dated May 21, 2012 for U.S. Appl. No. 12/714,443, filed on Feb. 27, 2010.

Notification of Transmittal of The International Search Report and The Written Opinion of the International Searching Authority for International Patent Application No. PCT/US2010/050146, Filed on Sep. 24, 2010 (Mailing Date Nov. 22, 2010).

Notification of Transmittal of The International Search Report and The Written Opinion of the International Searching Authority for International Patent Application No. PCT/US2011/22207, Filed on Jan. 24, 2011 (Mailing Date May 25, 2011).

Notification of Transmittal of The International Search Report and The Written Opinion of the International Searching Authority for International Patent Application No. PCT/US2011/023488, Filed on Feb. 2, 2011 (Mailing Date Apr. 12, 2011).

U.S. Appl. No. 29/509,093, filed Nov. 13, 2014, Chen, Including its prosecution history.

U.S. Appl. No. 29/509,094, filed Nov. 13, 2014, Chen, Including its prosecution history.

U.S. Appl. No. 14/479,165, filed Sep. 5, 2014, Chen, Including its prosecution history.

U.S. Appl. No. 29/489,642, filed May 1, 2014, Chen, Including its prosecution history.

U.S. Appl. No. 29/479,788, filed Jan. 20, 2014, Chen, Including its prosecution history.

* cited by examiner

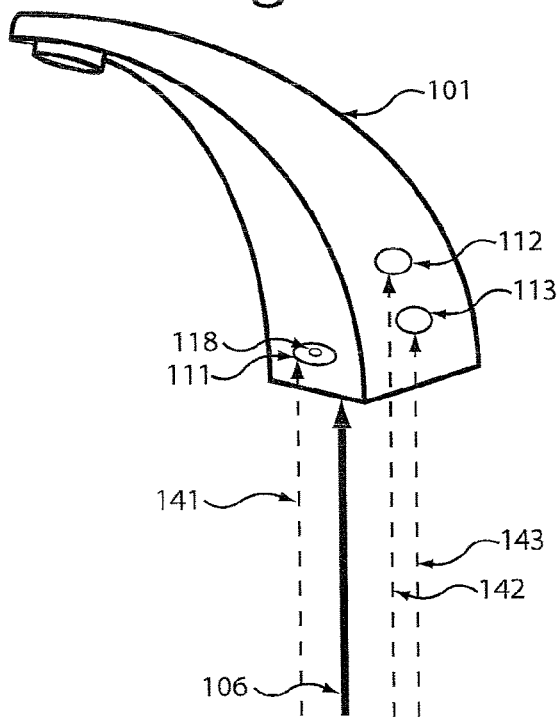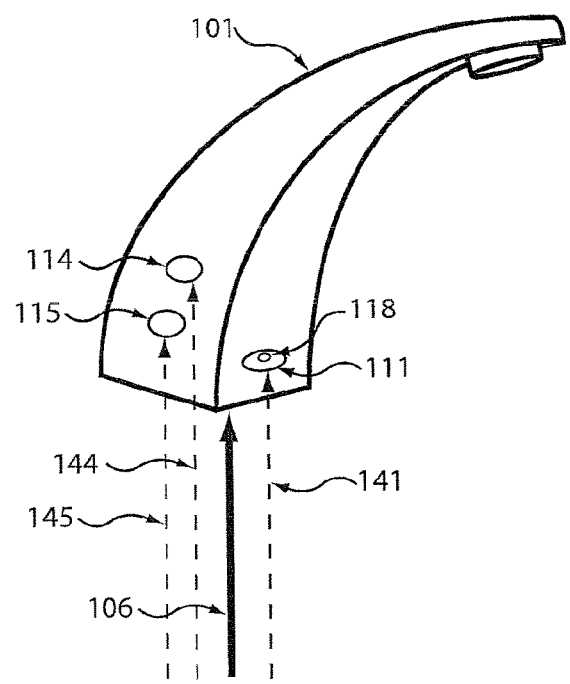

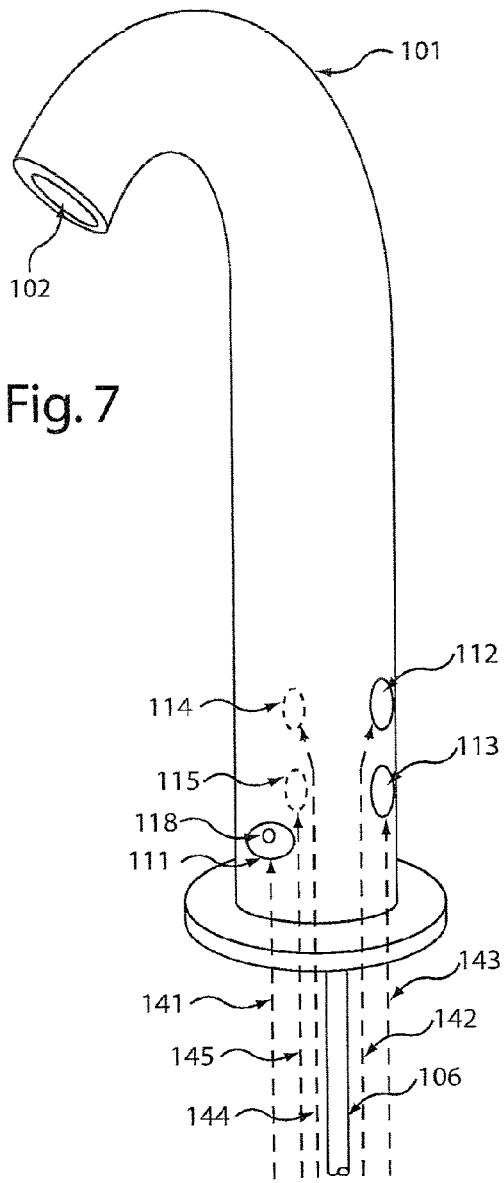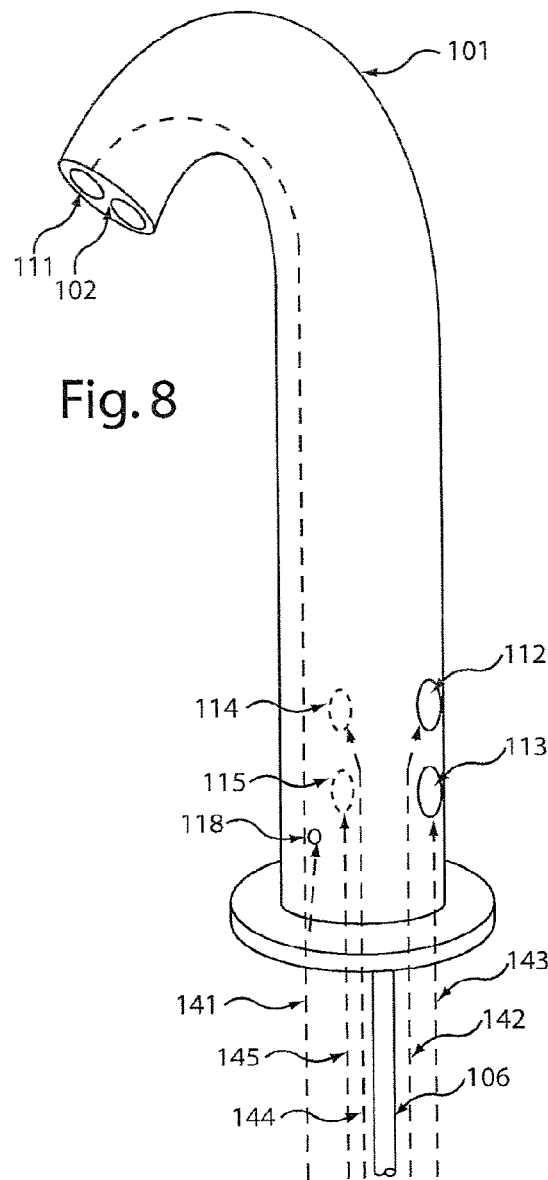

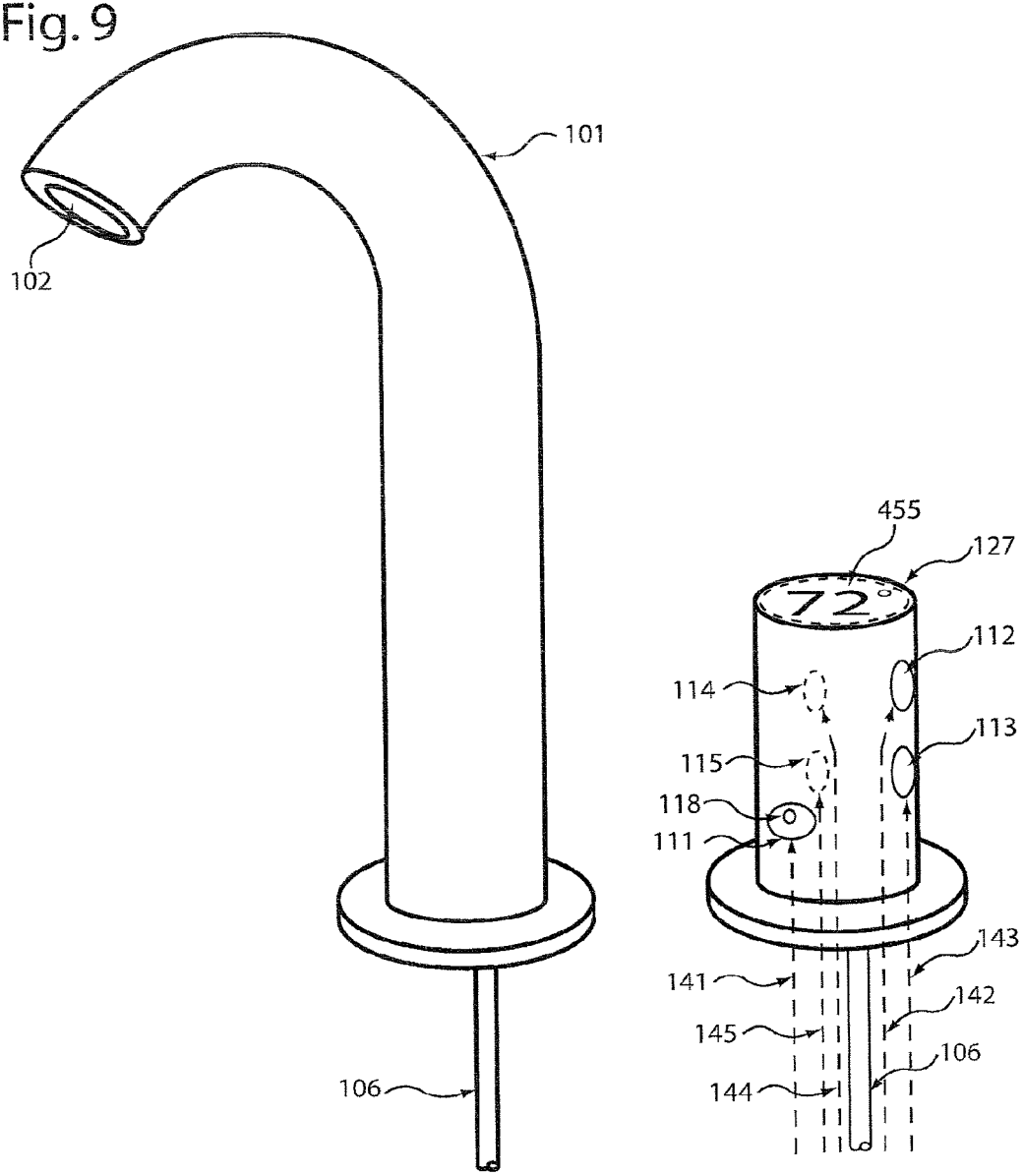

Fig. 19A
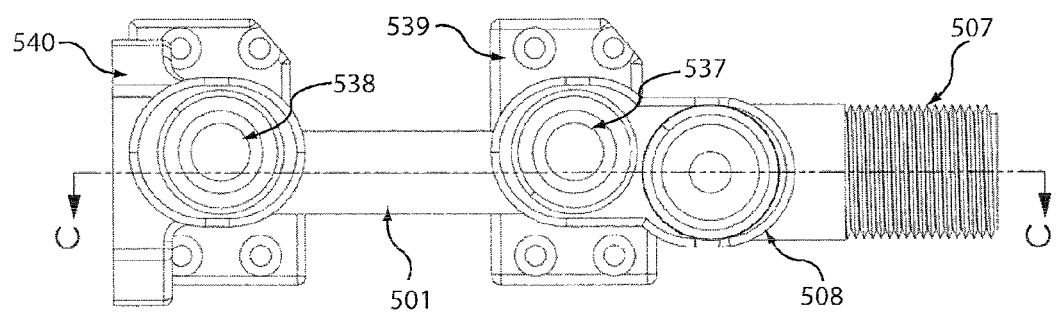
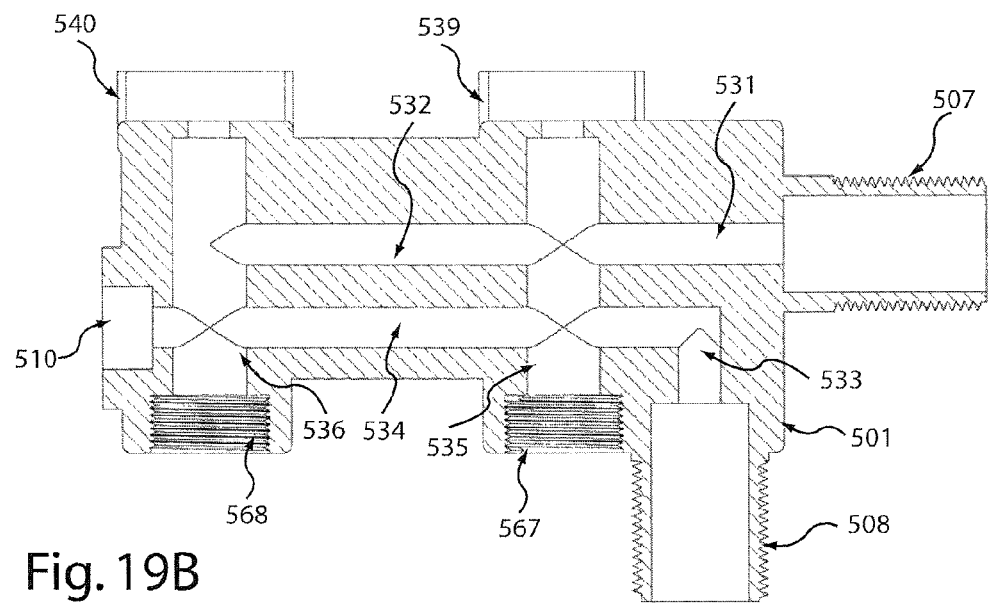
Fig. 19B

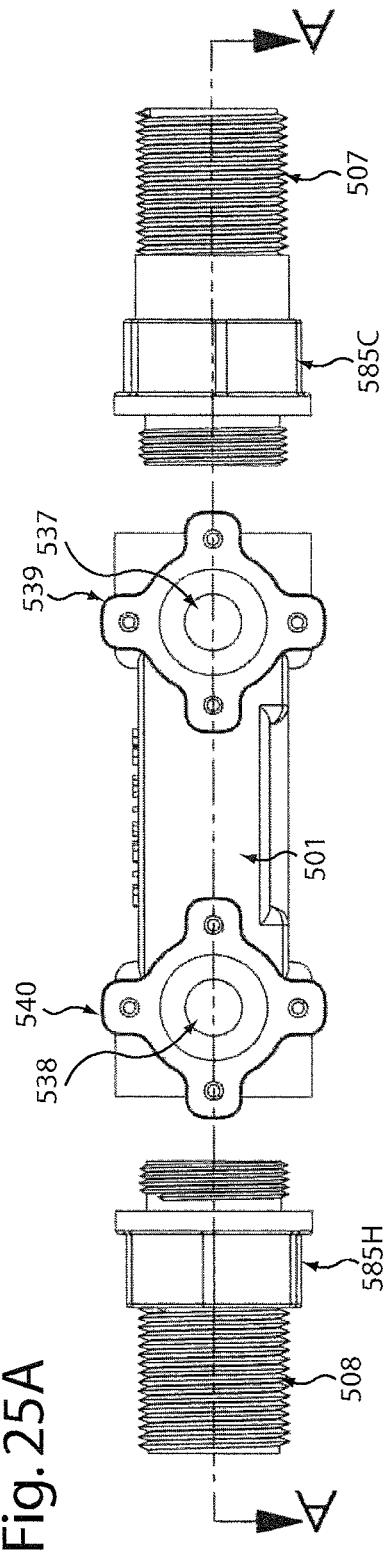
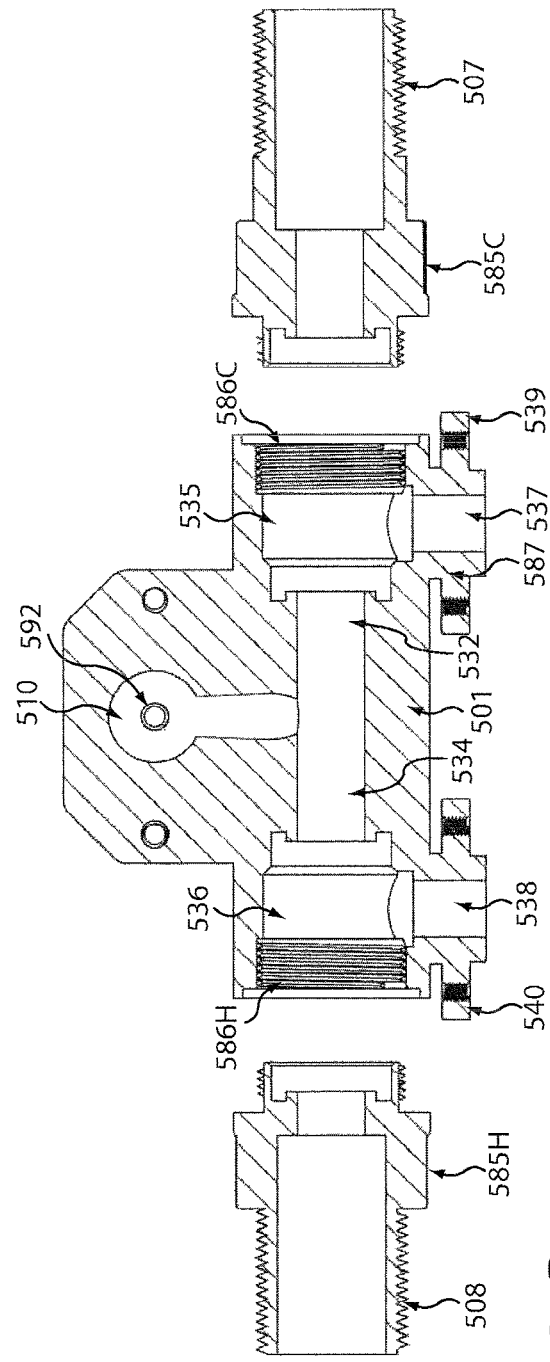
Fig. 25A
Fig. 25B

Fig. 30
Fig. 31
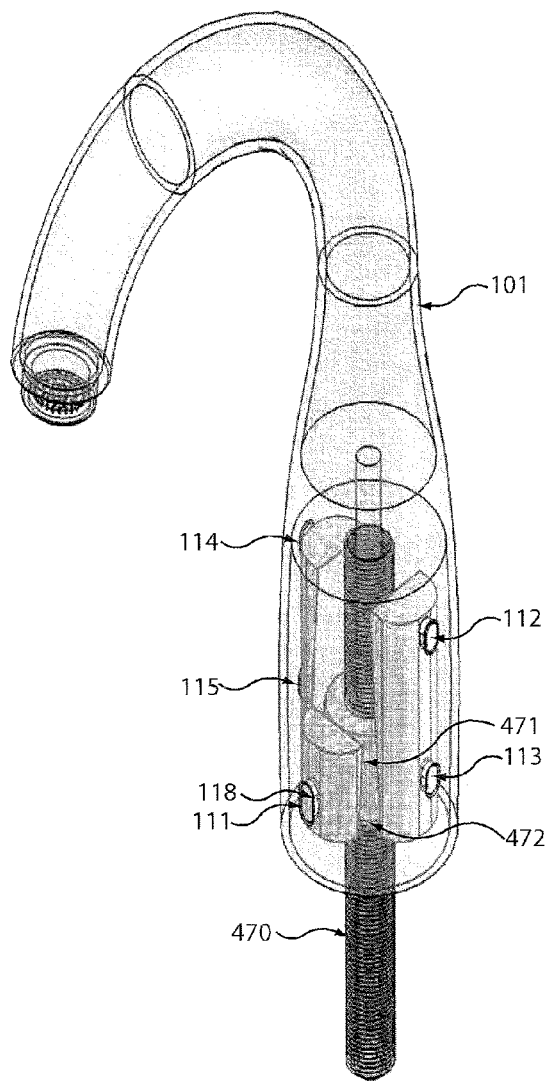
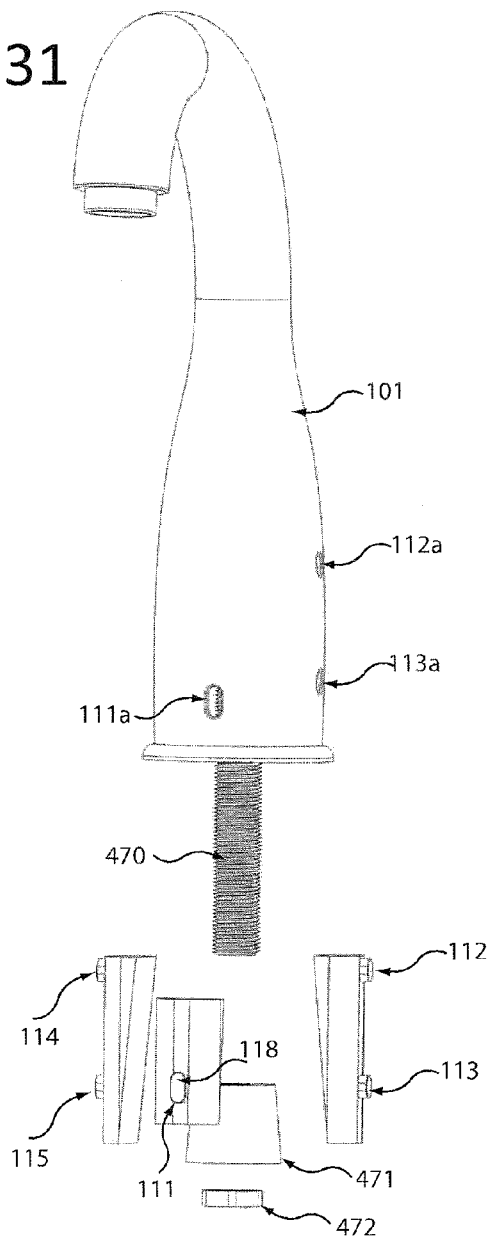

TOUCH FREE AUTOMATIC FAUCET

CROSS REFERENCE TO RELATED APPLICATIONS

This application is related to copending application Ser. No. 12/714,443, filed Feb. 27, 2010, which is herein incorporated by reference, and claims the benefit of Provisional Application No. 61/300,781 filed on Feb. 2, 2010.

BACKGROUND OF THE INVENTION

1. Field of the Invention

The present invention generally relates to the field of automatic faucets, more particularly the present invention relates to a touch free automatic faucet that uses infrared sensors in conjunction with logic processor that responds various functions to control water flow and temperature of faucet to provide an easy-convenient operation, water conservation and personal hygiene protection for commercial and residential applications.

2. Description of the Related Art

Automatic faucet has become popular for water saving and green earth. Because of the personal hygiene concern, touch free automatic faucets are ideal for public locations, commercial, residential applications.

The conventional automatic faucet is controlled with single electronic sensor to toggle on-off water flow with preset water temperature; most applications, such as kitchens, lavatories and some commercial, require adjustments on water flow, temperature and continuous water flow services.

BRIEF SUMMARY OF THE INVENTION

One embodiment of the invention provides a touch free automatic faucet. The faucet includes a faucet housing including many sensors for controlling water flow and water temperature. A processor is connected to the sensors. A first control valve assembly is connected to the processor. A second control valve assembly is connected to the processor. A power source is connected to the processor, the first control valve assembly and the second control valve assembly. Water flow and water temperature are controlled by the sensors without touching of the faucet housing.

Another embodiment of the invention provides a touch free automatic faucet. The touch free automatic faucet includes sensors for controlling water temperature. A processor is coupled to the sensors. A voltage source is coupled to the processor. A temperature control valve assembly is coupled to the processor. The processor controls water flow and temperature of water exiting the touch free automatic faucet.

Yet another embodiment of the invention provides a faucet. The faucet includes a plurality of sensors including: a main faucet control sensor, a primary and secondary temperature control sensor, and a primary and secondary water flow control sensors. A processor is coupled to the plurality of sensors. A water flow control valve assembly is coupled to the processor. A temperature control valve assembly is also coupled to the processor. A power supply is coupled to the processor and configured for controlling water flow through the water flow control valve assembly and water temperature through the temperature control valve assembly.

Still another embodiment of the invention provides a faucet housing including a plurality of sensor windows. A plurality of sensor assemblies is removably coupled to the faucet housing. A shaft is at least partially disposed within the faucet housing and coupled with a securing nut. The securing nut is configured to hold the sensor assemblies within the faucet housing, and for aligning the plurality sensor assemblies with the plurality of sensor windows.

Some embodiments include a touch-free automatic faucet system comprising a touch free automatic faucet mode; wherein water flow and water temperature are controlled by a flow control valve assembly and a temperature control valve assembly in response to the electronic sensors through a logic processor circuit board. The faucet can be operated either in automatic mode or manual mode to suit all different applications.

In some embodiments of the invention, the sensing beams of an installed primary electronic sensor (Sensor C), a pair of secondary sensors (Sensor A and Sensor B) and a pair of tertiary sensors (Sensor D and Sensor E) are pointed to different directions, at about 90 degree angle from each other to prevent interference, to control water temperature (Temperature-Control-Mode), continuous water flow (Continue-Water-Flow-Mode), faucet pause (Faucet-Pause-Mode), water flow adjustment (Adjust-Water-Flow-Mode), default setting (Common-Default-Mode) and customized preset (Customized-Preset-Mode) for residential and commercial applications for easy-convenient operation, water conservation and personal hygiene protection.

In one or more embodiments of the invention a programmed logic processor with a circuit board controls the sensors, a water flow control valve assembly and a temperature control valve assembly. As in a conventional automatic faucet operation, detection of an object in presence within the primary sensor (Sensor C) detection zone (for example, in a sink), the logic processor hence activates the flow control valve assembly (Valve A) for water flow to the faucet spout (activation of Primary-Water-Flow-Mode).

In some embodiments of the invention, the activation of Primary-Water-Flow-Mode, the water flow control valve assembly (Valve A) is in an activated position for water flow and the primary sensor (Sensor C) senses no object in presence within the detection zone (for example, in a sink), the logic processor hence deactivates the water flow control valve assembly (Valve A) to stop water flow to the faucet spout (deactivation of Primary-Water-Flow-Mode).

In one or more embodiments of the invention, at any time, both secondary sensors (Sensor A and Sensor B) sense the presence of an object (for example, a hand) within the detection zone for a predetermined time period (Time Continueflow-on), the logic processor activates the water flow control valve assembly (Valve A) for a continuous water flow (Continue-Water-Flow-Mode) to faucet spout. This Continuous-Water-Flow-Mode operation is convenient for users to filling sink or container without keeping their hands within the detection zone of the primary sensor (Sensor C) for continuous water flow (activation of Continue-Water-Flow-Mode).

In some embodiments of the invention, when the water flow control valve assembly (Valve A) is activated for water flow to the faucet spout the temperature can be changed. When Sensor A of the secondary sensors detects the presence of an object (for example, a finger) within the detection zone, the logic processor increases the faucet water flow temperature by increasing hot water flow and decreasing cold water flow of the temperature control valve assembly (Valve B) accordingly depending on the sensing time period of sensor (Sensor A). When Sensor B of secondary the sensors senses the presence of an object (for example, a finger) within the detection zone, the logic processor decreases the faucet water flow temperature by decreasing hot water flow and increasing cold water flow of the temperature control valves assembly (Valve B) accordingly depending on the sensing time period of sensor (Sensor B). Faucet water flow temperature is controlled by the function of the pair of secondary sensors (Sensor A and Sensor B) without any touching of any parts of the faucet body (Temperature-Control-Mode).

In one or more embodiments of the invention, when the water flow control valve assembly (Valve A) enters an activated position allowing for water flow, the volume of flow can be changed. When Sensor D of the tertiary sensors senses the presence of an object (for example, a finger) within the detection zone, the logic processor increases the water flow to the faucet spout by increasing both hot and cold water flow of the water flow control valve assembly (Valve A) accordingly depending on the sensing time period of Sensor D. When sensor E of the tertiary sensors senses the presence of an object (for example, a finger) within the detection zone, the logic processor decreases the water flow to the faucet spout by decreasing both hot and cold water flow of the water flow control valves assembly (Valve A) accordingly depending on the sensing time period of Sensor E. Faucet water flow is adjusted by the function of the pair of tertiary sensors (Sensor D and Sensor E) without any touching of any parts of the faucet (Adjust-Water-Flow-Mode).

In some embodiments of the invention, in the Continue-Water-Flow-Mode, the water flow control valve assembly (Valve A) is activated for water flow. In this mode, when both of the secondary sensors (Sensor A and Sensor B) sense the presence of an object (for example, a hand) within the detection zone for a predetermined time period (Time Continue-flow-off), the logic processor deactivates the water flow control valve assembly (Valve A) to stop continuous water flow (Continue-Water-Flow-Mode) to the faucet spout (deactivation of Continue-Water-Flow-Mode) upon the sensors not sensing the presence of an object.

In one or more embodiments of the invention, in the standby condition of the faucet the primary sensor (Sensor C) does not sense an object's presence within the detection zone and the flow control valve assembly (Valve A) is in a deactivation condition. In the standby mode, no water flows from the faucet spout. While in standby mode, detection of an object (for example, a hand or finger) within the detection zone of Sensor A of the secondary sensors for a predetermined time period (Time Sc-pause) triggers the logic processor to pause the function of the primary sensor (Sensor C), which may be referred to as "Faucet-Pause-Mode." In this Faucet-Pause-Mode, a user can work within the primary sensor detection zone without activating faucet water flow for water conservation (beginning of Faucet-Pause-Mode).

In some embodiments of the invention, in the Faucet-Pause-Mode the primary sensor (Sensor C) is paused. When Sensor A of the secondary sensors detects an object (for example, a hand or finger), within the detection zone for a predetermined time period (Time Sc-reset), it triggers the logic processor to reset the function of primary sensor (Sensor C). The faucet system is thereby reset back to the stand-by condition (reset of Faucet-Pause-Mode).

In some embodiments of the invention, a primary sensor (Sensor C), the pair of secondary sensors (Sensor A and Sensor B) and the pair of tertiary sensors (Sensor D and Sensor E) are functionable to fully control the water flow and water temperature of touch free automatic faucet embodiments of the invention for commercial and residential applications. The water flow control valve assembly and water temperature control valve assembly have two fluid inlet (cold/hot water inlet) and one fluid outlet (mixed cold/hot water flow) conduits, combining with one or more of electric solenoid valves and electric motorized gear valves therefrom to control water flow to the faucet spout.

In one or more embodiments of the invention, when the faucet is in the Primary-Water-Flow-Mode or Continue-Water-Flow-Mode, the water flow control valve assembly (Valve A) is in an activated position for water flow. When both Sensor D and Sensor E of the tertiary sensors sense the presence of object (for example, a hand) within the detection zone for a predetermined time period (Time-Default-Setting), the logic processor sets the current temperature and flow condition as the default settings for water flow (Common-Default-Mode). The unique Default flow and Temperature Reset function prevents a user from accidently becoming injured by sudden hot water flow from a previous usage and maintains faucet water flow at a minimum requirement for water conservation.

In one embodiment of the invention, at least three default settings exist for the faucet. In one example, the default settings are as follows: 1) Common default setting.—for all users, when the faucet does not have either Customized Preset 1 or 2 set; 2). Customized Preset 1—used with Sensor D; and 3) Customized Preset 2—used with Sensor E.

Using Preset 1: When the water is not flowing as Flow control valve A is Off, and Sensor D senses an object (e.g., a finger, a hand, etc.) for a predetermined time period and the water flow is then turned on with Sensor C or Continuous Water Flow Mode within another predetermined time period, then water will flow at using the Preset 1 condition. This is similar for Preset 2.

Using Stand-By: when the system is in standby and the water flow commences with Sensor C or Sensor A and B, the water flows at the Common-Default flow rate. When, after a Time-default amount of seconds without water flow, the faucet is set back to the Common-Default-Mode. If, prior to starting water flow, an object is sensed by sensor D, and then the user commences water flow with sensing by Sensor C or Sensor A and B, water will then flow at the preset 1 flow rate. When, after the predetermined Time-default period without water flow, the faucet is set back to the Common-Default-Mode. If, prior to starting water flow, an object is sensed by sensor E, and then the user commences water flow commences with sensing by Sensor C or sensing by Sensors A and B, water will then flow at the preset 2 flow rate. When, after the predetermined Time-default period without water flow, the faucet is set faucet back to the Common-Default-Mode.

How to set Preset 1: when the water is turned on with Preset 1, and both sensors D and E (Tertiary Sensors) sense an object for a predetermined time period, then the logic processor sets the current Flow and temperature condition as a new Preset 1. The same is true for Preset 2, albeit the different predetermined time period. How to set a new Common-Default setting from Stand-By mode: when the system is in standby mode and the water flow is commenced with sensing by Sensor C or Sensors A and B, then water flows at the Common-Default setting. The user can then change water flow rate or temperature by sensing of Sensors D and E, and save a new Common-Default. Setting preset 1 is similar. After Sensor D senses an object, water flow commences with sensing by Sensor C or Sensors A and B at preset 1. Users can change water flow rate or temperature to a new condition and save to a new preset 1 by having Sensors D and E sense an object. Setting preset 2 is similar. After sensing an object by Sensor E water flow commences with sensing by Sensor C or Sensors A and B at the preset 2 settings. Users can change the flow rate or temperature to a new flow condition by Sensors D and E sensing an object for a predetermined time. The setting is then saved as the new preset 2 setting.

In one or more embodiments of the invention, when the primary sensor (Sensor D) of the pair of tertiary sensors detects an object (for example, a hand or finger) within the detection zone for a predetermined time period (Time Sd-preset), it triggers the logic processor to set in the (Customized-Preset-Mode). When the faucet is then activated in the Primary-Water-Flow-Mode or Continue-Water-Flow-Mode within a predetermined time period (Time Preset), the water flow control valve assembly (Valve A) and water temperature control valve assembly (Valve B) responds for water flow at the first customized preset water flow and temperature.

In one or more embodiments of the invention, when the secondary sensor (Sensor E) of the pair of tertiary sensors detects an object (for example, a hand or finger) within the detection zone for a predetermined time period (Time Se-preset), it triggers the logic processor to set in the (Customized-Preset-Mode). When the faucet is then activated in the Primary-Water-Flow-Mode or Continue-Water-Flow-Mode within a predetermined time period (Time Preset), the water flow control valve assembly (Valve A) and water temperature control valve assembly (Valve B) responds for water flow at the second customized preset water flow and temperature.

In one or more embodiments of the invention, when the faucet was activated by a one of the customized presets (Customized-Preset-Mode), and the water flow control valve assembly (Valve A) is in an activated position for water flow. If both of the Sensor D and Sensor E of the tertiary sensors sense the presence of object (for example, a hand) within the detection zone for a predetermined time period (Time-Default-Setting), the logic processor will set the current temperature and flow condition as the customized preset default settings for water flow (Customized-Preset-Default-Mode). The unique customized preset default flow and temperature function is comfort and convenient for personal favorite.

In one or more embodiments of the invention a logic processor circuit board comprises a logic processor (Micro Chip) and a circuit board. The logic processor is programmed to function for input and output of all the electronic sensors (Sensor A, Sensor B, Sensor C, Sensor D and Sensor E), and water flow control valve assembly (Valve A) and water temperature control valve assembly (Valve B). An electricity power supply package includes a battery pack (rechargeable or not) and an alternating current to direct current (AC-DC) transformer to supply direct current to the logic processor circuit board to activate the sensors, the flow control valves assembly and the motorized temperature control valves assembly.

The touch free automatic faucet provides water conservation functions as a conventional automatic faucet. The water flow and temperature are maintained at the most comfortable temperature and economic flow rate for water conservation.

In some embodiments of the invention the function of the pair of secondary sensors (Sensor A and Sensor B) controls the faucet water temperature with a "touch free" operation. The Default Temperature Reset function prevents injury by sudden hot water flow. Activation of both secondary sensors (Sensor A and Sensor B) controls a continuous water flow of the faucet. Sensor A of the secondary sensors pauses the function of the primary sensor (Sensor C) and stops water flow for a user to work within the primary detection zone without activating faucet water flow for water conservation. The pair of tertiary sensors (Sensor D and Sensor E) adjusts faucet water flow (i.e., increases/decreases).

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which:

FIG. 5 illustrates the electronic sensors located on one side according to one embodiment of the invention;

FIG. 6 illustrates the electronic sensors located on another side according to one embodiment of the invention;

FIG. 7 illustrates an arrangement of electronic sensors according to one embodiment of the invention;

FIG. 8 illustrates another arrangement of electronic sensors according to one embodiment of the invention;

FIG. 9 illustrates yet another arrangement of electronic sensors according to one embodiment of the invention;

FIG. 19A illustrates a top interior view of another water flow and temperature control valve assembly according to one embodiment of the invention;

FIG. 19B illustrates a side interior view of another water flow and temperature control valve assembly according to one embodiment of the invention;

FIG. 25A illustrates a top interior view of the water flow and temperature control valve assembly shown in FIG. 24 according to one embodiment of the invention;

FIG. 25B illustrates a side interior view of another water flow and temperature control valve assembly shown in FIG. 24 according to one embodiment of the invention;

FIG. 30 illustrates an internal view of a touch-free automatic faucet system according to one embodiment of the invention; and FIG. 31 illustrates an exploded view of the touch-free automatic faucet system shown in FIG. 30 according to one embodiment of the invention;

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for touch free automatic faucets, as well as operation and/or component parts thereof. While the following description will be described in terms of automatic touch free faucets for clarity and placing the invention in context, it should be kept in mind that the teachings herein may have broad application to all types of systems, devices and applications.

An illustrative embodiment of the present invention provides a lavatory-bathroom-kitchen-type faucet that can be fully functionable for all operational needs. In order to provide water-efficient operation that is easy and convenient to use, the water flow is activated and deactivated in response to a primary electronic sensor that detects an object presence under the spout, so as to provide the most water-efficient operation in Primary-Water-Flow-Mode. For other applications, such as filling the sink or bathtub, a container or for washing dishes, washing food, running a shower, etc., continuous water flow is needed. In one embodiment of the invention, the faucet can be switched in/out a Continue-Water-Flow-Mode without touching any part(s) of the faucet body. The personal hygiene of a person is protected by not having to come into contact with any portion of the faucet.

In the uniquely designed Faucet-Pause-Mode a user can work in the vicinity of the faucet without having the water running. Furthermore, the two pairs of sensors function in an Adjust-Water-Flow-Mode and a Temperature-Control-Mode to adjust water flow and temperature without a user having to contact the faucet. A Common-Default-Mode function provides a default water flow setting and a default water temperature setting to prevent users accidently becoming injured by sudden hot water flow from a previous usage and also to maintain faucet water flow at a minimum requirement for water conservation.

Figure 1:
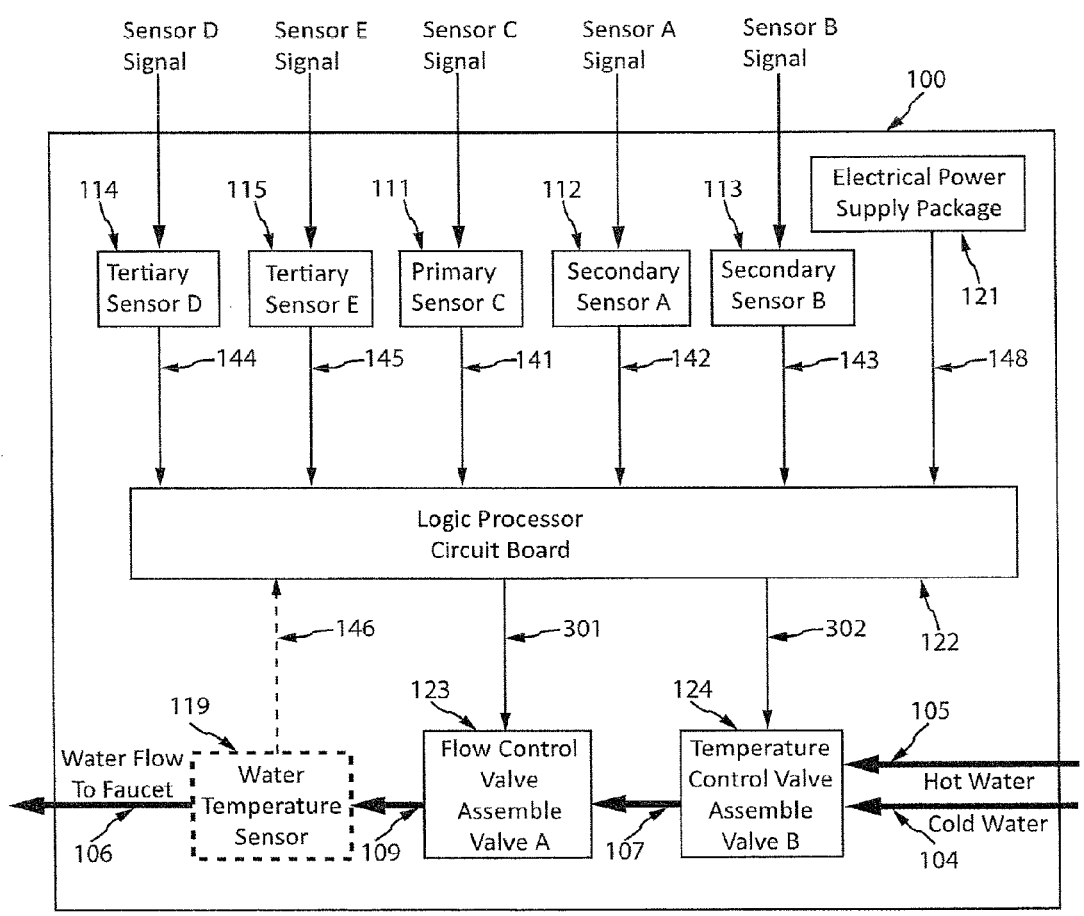
FIG. 1 is a block diagram of a touch-free automatic faucet system according to one embodiment of the invention.

FIG. 1 is a block diagram of an illustrative touch free automatic faucet according to one embodiment of the invention. The illustrative touch-free automatic faucet system (100) is shown coupled to a cold water source (104), a hot water source (105) and an outlet for mixed water flow to the faucet (106). The system (100) includes one primary electronic sensor C (111), a pair of secondary electronic sensor assemblies A and B (112 and 113), a pair of tertiary electronic sensor assemblies D and E (114 and 115), an electrical power supply package (121), a logic processor circuit board (122), a water flow control assembly A (123), a temperature control system assembly B (124) and an optional water temperature sensor 119. In one embodiment of the invention, the power supply package (121) may be one or more a batteries, one or more rechargeable batteries, a solar cell system, a DC voltage supplied from an AC/DC converter, etc.

The sensing signals (141, 142, 143, 144 and 145) from the primary electronic sensor C (111), the pair of secondary electronic sensors A and B (112, 113) and the pair of tertiary electronic sensors D and E (114, 115) input signals to the logic processor circuit board (122). The outputs of the logic processor (301 and 302) control the water flow control assembly (123) and temperature control system assembly (124). The electricity power supply package (121) supplies electrical power (148) to logic process circuit board (122) for powering the whole system. In one embodiment of the invention, water flow 107 exits the temperature control system assembly B (124) and enters the water flow control assembly A (123). In one embodiment of the invention, the water flows from the water flow control assembly A (123) and flows to the faucet as a stream 106, or when the touch-free automatic faucet system (100) includes the optional water temperature sensor 119, the water flow 109 leaves the water flow control assembly A (123) and enters or otherwise comes in contact with the water temperature sensor 119 before flowing to the faucet as water flow 106.

In one embodiment of the invention, the water temperature sensor 119 detects the mixed water temperature flow 106 to the faucet spout. The sensed temperature signal 146 is transmitted to the logic processor 122, and is also used for displaying the water flow temperature on a display device, such as an LED lighting device, LCD lighting device, etc. In one embodiment of the invention, the display may be located on the faucet spout 101, or within a close proximity to the faucet. In another embodiment of the invention, the water temperature sensor controls the temperature control valve assembly 124 to control excessive temperature that is sensed, which can prevent injuries due to excessive water temperature being sensed by the water temperature sensor 119, which transmits a signal to the logic processor 122 to control the temperature control valve assembly 124.

Figure 2:
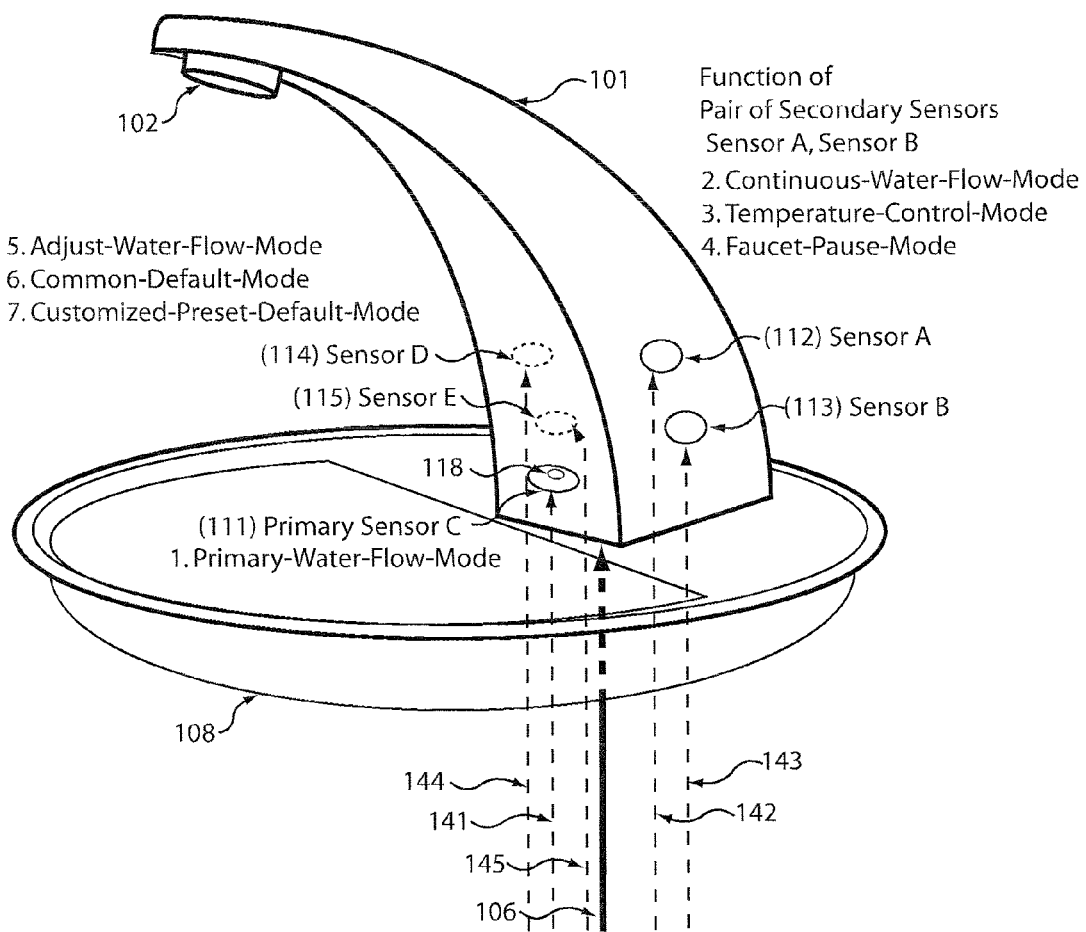
FIG. 2 is a diagram illustrating functions of a touch-free automatic faucet system according to one embodiment of the invention.

FIG. 2 is a diagram illustrating embodiments of the different functions of the touch-free automatic faucet system according to one embodiment of the invention. The function of the primary sensor C (111) is to activate the Primary-Water-Flow-Mode when water is needed in the sink area (108) for washing hands or foods, filling the sink, etc. The pair of secondary sensors (Sensor A) (112) and (Sensor B) (113) serves three different functions: adjust water temperature, pause the primary sensor (Sensor C) and the combination functions of the secondary sensors (Sensor A and Sensor B) (112 and 113) is to activate/deactivate a Continue-Water-Flow Mode for filling the sink, a container, or to wash dishes, wash food, etc.

In the Primary-Water-Flow-Mode or the Continue-Water-Flow-Mode, when water is flowing from the faucet, the pair of secondary sensors (Sensor A and Sensor B) (112 and 113) function to adjust water temperature (Temperature-Control-Mode) up/down. Upon the primary sensor (Sensor C) (111) entering in a deactivation condition, activation of Sensor A (112) triggers a "Faucet-Pause-Mode" to pause the function of Sensor C (111) to enable the user to work in the vicinity of faucet without water flowing. The pair of tertiary sensors (Sensor D, Sensor E) (114) (115) control the water flow of the faucet (Adjust-Water-Flow-Mode).

The pair of secondary sensors (Sensor A, Sensor B) (112) (113) and the pair of tertiary sensors (Sensor D, Sensor E) (114) (115) control the default setting of water flow and temperature of the faucet (Common-Default-Mode). In one embodiment of the invention, a common default mode may be used for pre-setting water flow and/or temperature control. In one example, when the water flow control valve assembly A (124) is placed in an activated position for water flow by the logic processor 122 upon both the primary sensor D (114) and the secondary sensor of the tertiary sensor E (115) sensing presence of an object (e.g., a finger) within the respective detection zones for a predetermined period of time (e.g., 2 seconds, 10 seconds, etc.), an LED indicator light blinks (and/or a sound chip produces an audio indication), the logic processor (122) sets a current temperature and water flow condition as a common default setting (Common-Default-Mode).

The pair of secondary sensors (Sensor A, Sensor B) (112) (113) and the pair of tertiary sensors (Sensor D, Sensor E) (114) (115) control the customized preset default operation of water flow and temperature of the faucet (Customized-Preset-Default-Mode). In one embodiment of the invention, one of the tertiary sensors may be used for pre-setting water flow and/or temperature control. In one example, when the primary sensor (Sensor D) (114) of the tertiary sensors sensing presence of an object (e.g., a finger) within the respective detection zones for a predetermined period of time (e.g., 2 seconds, 10 seconds, etc.), an LED indicator light blinks (and/or a sound chip produces an audio indication). If the water flow control valve assembly A (124) is then placed in an activated position for water flow by the logic processor (122) upon the activation of the Primary Sensor C (111) for a Primary-Water-Flow-Mode or by the pair of secondary sensors (Sensor A and Sensor B) (112 and 113) for a Continuous-Water-Flow-Mode within a predetermined period of time (e.g., 2 seconds, 10 seconds, etc.), water will flow at the temperature and flow condition of the customized preset 1 (Customized-Preset-Default-Mode).

In another example, when the primary sensor (Sensor E) (115) of the tertiary sensors sensing presence of an object (e.g., a finger) within the respective detection zones for a predetermined period of time (e.g., 2 seconds, 10 seconds, etc.), an LED indicator light blinks (and/or a sound chip produces an audio indication). If the water flow control valve assembly A (124) is then placed in an activated position for water flow by the logic processor (122) upon the activation of the Primary Sensor C (111) for a Primary-Water-Flow-Mode or by the pair of secondary sensors (Sensor A and Sensor B) (112 and 113) for a Continuous-Water-Flow-Mode within a predetermined period of time (e.g., 2 seconds, 10 seconds, etc.), water will flow at the temperature and flow condition of the customized preset 2 (Customized-Preset-Default-Mode).

The pair of secondary sensors (Sensor A, Sensor B) (112) (113) and the pair of tertiary sensors (Sensor D, Sensor E) (114) (115) control the customized preset default setting of water flow and temperature of the faucet (Customized-Preset-Default-Mode). In one embodiment of the invention, one of the tertiary sensors may be used for pre-setting water flow and/or temperature control. In one example, when the water flow was initiated by the customized preset default preset 1 condition as described in above paragraph and the water flow control valve assembly A (124) is placed in an activated position for water flow by the logic processor (122), upon both the primary sensor D (114) and the secondary sensor of the tertiary sensor E (115) sensing presence of an object (e.g., a finger) within the respective detection zones for a predetermined period of time (e.g., 2 seconds, 10 seconds, etc.), an LED indicator light blinks (and/or a sound chip produces an audio indication) and the logic processor (122) sets a current temperature and water flow condition as a new customized preset 1 (Customized-Preset-Default Mode).

In another example, when the water flow was initiated by the customized preset default preset 2 condition as described in above paragraph and the water flow control valve assembly A (124) is placed in an activated position for water flow by the logic processor (122), upon both the primary sensor D (114) and the secondary sensor of the tertiary sensor E (115) sensing presence of an object (e.g., a finger) within the respective detection zones for a predetermined period of time (e.g., 2 seconds, 10 seconds, etc.), an LED indicator light blinks (and/or a sound chip produces an audio indication) and the logic processor (122) sets a current temperature and water flow condition as a new customized preset 2 (Customized-Preset-Default-Mode).

In another example, upon the water flow control valve assembly A (123) being placed in an inactivated position (where no water flows) by the logical processor 122 when either the primary sensor of the tertiary sensors (tertiary sensor D 114) or the secondary sensor of the tertiary sensors (tertiary sensor E 115) senses an object within their respective detection zones for a predetermined time period (e.g., 2 seconds, 10 seconds, etc.), the logical processor 122 activates the first preset or second preset for temperature control and water flow. In another example, whenever a change of temperature or water flow is made, it will clear the preset operation conditions for temperature and water flow. In one embodiment of the invention the water outlet 102 may house the primary sensor 111 depending upon application or desire.

Figure 3:
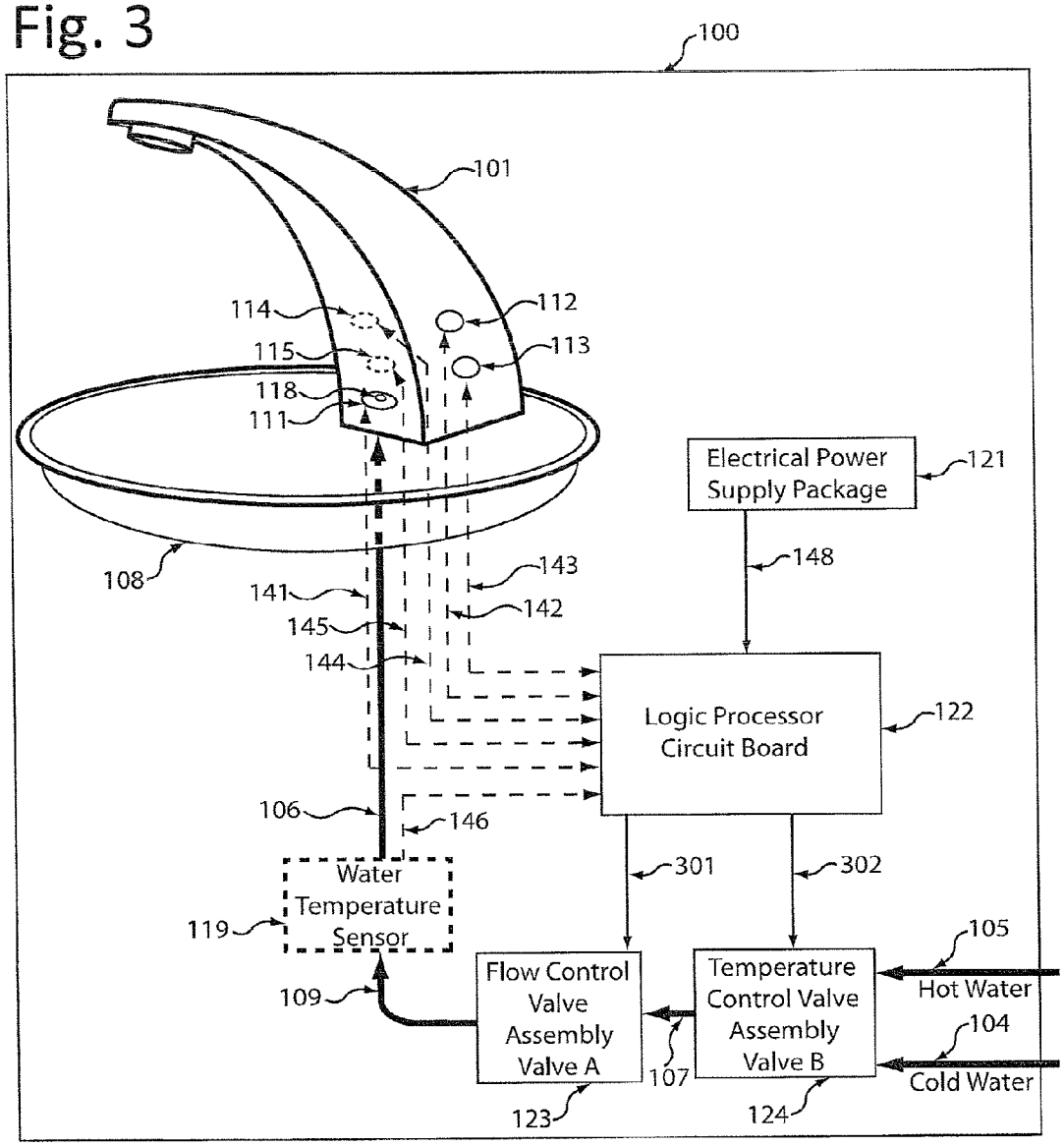
FIG. 3 is a flow diagram of the control logic of the system and method according to one embodiment of the invention.

FIG. 3 is an illustrative embodiment of a lavatory-kitchen-type faucet according to one embodiment of the invention. The illustrative touch-free automatic faucet system (100) is shown with a mixed water flow (106) to the faucet spout (101). Faucet spout (101) comprises one primary electronic sensor (111), an LED indicator (118), a pair of secondary electronic sensors (112 and 113) and a pair of tertiary electronic sensors (114 and 115) that are mounted on the faucet body (101). Each of these electronic sensors (111, 112, 113, 114 and 115) include an infrared transmitter and receiver to detect the presence of an object, and an LED indicator (118) for system information indication.

The primary sensor C (111) senses the sink area (108) for the Primary-Water-Flow-Mode operation. The pair of secondary sensors A and B (112 and 113) and the pair of tertiary electronic sensors (114 and 115) function to control the Continue-Water-Flow-Mode, the Temperature-Control-Mode, the Faucet-Pause-Mode and the Adjust-Water-Flow-Mode of the faucet (101). The faucet system (100) also includes an electricity power supply package (121) to supply the necessary electrical power (148) to the control system, a logic processor circuit board (122) with a preloaded logic program to control the faucet system (100), a water flow control valve assembly (123), a temperature control valve assembly (124) to control water flow (301) and temperature (302), and the optional water temperature sensor 119.

Figure 4:
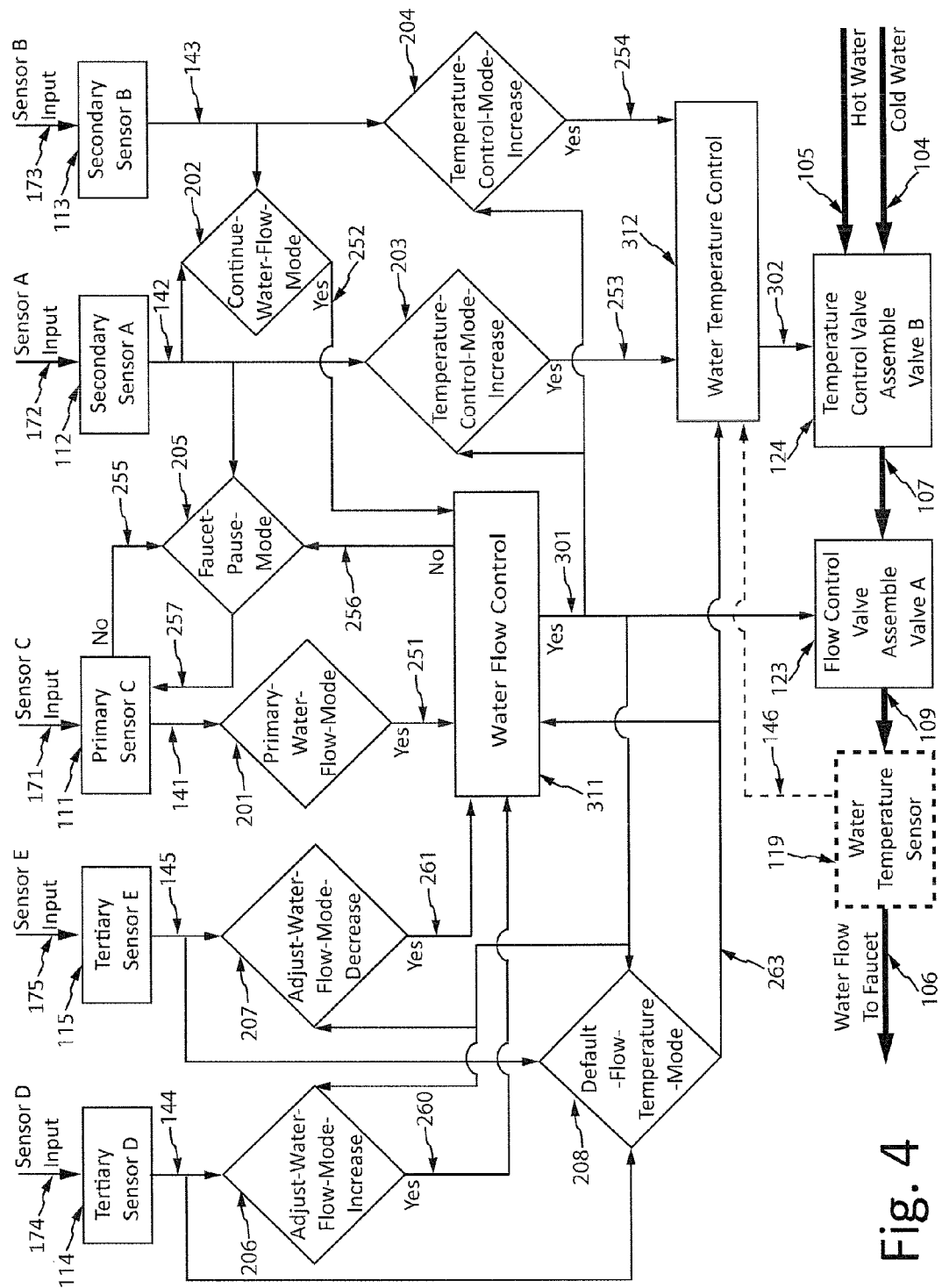
FIG. 4 is a logic flow diagram of the control logic of the system and method according to one embodiment of the invention.

FIG. 4 is a logic diagram that shows the logic procedures and method of the system using an electronic sensor (e.g., infrared sensor), detection devices, a logic processor 122 (including 311 and 312), water flow control valves for water flow and temperature control to enable "touch free" and "automatic" use of the faucet according to one embodiment of the invention.

An object present within the primary sensor (Sensor C) (111) detection zone (171) (for example, in a sink) activates (141) the primary sensor (Sensor C) (111) and the logic processor (122) activates (301) the flow control valve assembly (Valve A) (123) for water flow to the faucet spout (101) (activation of Primary-Water-Flow-Mode) (201).

In the activation of the Primary-Water-Flow-Mode (201) operation, the water flow control valve assembly (Valve A) (123) is in activated position for water flow, and when the primary sensor (Sensor C) (111) does not detect (141) that an object is present within the detection zone (171) (for example, in a sink), the logic processor (122) deactivates (301) the water flow control valve assembly (Valve A) (123) to stop the water flow to the faucet spout (101) (deactivation of Primary-Water-Flow-Mode) (201).

At any time, both of the secondary sensors (Sensor A and Sensor B) (112 and 113) sense the presence of an object (for example, a hand) within the detection zone for a predetermined time period (Time Continue-flow-on) (142 and 143), the logic processor (122) activates (301) the water flow control valve assembly (Valve A) (123) for a continuous water flow (252) (Continue-Water-Flow-Mode) (202) to the faucet spout (101). The Continuous-Water-Flow-Mode (202) operation is convenient for users filling the sink or a container without keeping their hands within the detection zone (108) of the primary sensor (Sensor C) (111) (activation of Continue-Water-Flow-Mode) (202).

As illustrated in FIG. 4, when the water flow control valve assembly (Valve A) (123) is in an activated position for water flow (301) to the faucet spout (101), and Sensor A (112) of the secondary sensors detects (142) the presence of an object (for example, a finger) within the detection zone (172), the logic processor (122) increases the faucet water flow temperature by increasing hot water flow (105) and decreasing cold water flow (104) of the temperature control valve assembly (Valve B) (124) accordingly, depending on the sensing time period of sensor (Sensor A) (112). When the Sensor B (113) of the pair of secondary sensors detects (173) the presence of an object (for example, a finger) within the detection zone (143), the logic processor (122) decreases the faucet water flow temperature by decreasing hot water flow (105) and increasing cold water flow (104) of the temperature control valves assembly (Valve B) (124) accordingly, depending on the sensing time period of the sensor (Sensor B) (113). Faucet water flow temperature is controlled by the functioning of the pair of secondary sensors (Sensor A and Sensor B) (112 and 113) without a person or object touching any parts of the faucet body (101) (Temperature-Control-Mode) (203 and 204). In one embodiment of the invention, the optional water temperature sensor 119 operates to sense the temperature and feedback a signal to the logical processor 122. In this embodiment of the invention, the logical processor 123 sends a signal to either the temperature control valve assembly (Valve B) 124 to reduce temperature if the sensed temperature exceeds a predetermined temperature, or sends a signal to the flow control valve assembly (Valve A) 123 to turn off water flow if the predetermined maximum temperature setting is exceeded. The water temperature sensor maintains safety to prevent a person from coming in contact with water heated to an excessive temperature. Additionally, the water temperature sensor 119 provides an indicator to alert users of the current water temperature. In one example, the indicator is an LED indicator that displays temperature in either degrees Fahrenheit or Celsius. In another example, the indicator is a sound indicator that produces a sound (e.g., a beep) or states the temperature in a preferred language. In another example, both sound and light indicators are used to indicate the current water temperature to users.

In one embodiment of the invention, in either the Primary-Water-Flow-Mode (201) and Continue-Water-Flow-Mode (202), the water flow control valve assembly (Valve A) (123) is in an activated position for water flow (301) to the faucet spout (106). When Sensor D (114) of the tertiary sensors senses (144) the presence of an object (for example, a finger) within the detection zone (174), the logic processor (122) increases the water flow (260) to the faucet spout (101) by increasing both hot and cold water flow of the water flow control valve assembly (Valve A) (123) accordingly, depending on the sensing time period of Sensor D (144). Upon the Sensor E (145) of the tertiary sensors senses (145) the presence of an object (for example, a finger) within the detection zone (175), the logic processor (122) decreases the water flow (261) to the faucet spout (101) by decreasing both hot and cold water flow of the water flow control valves assembly (Valve A) (123) accordingly depending on the sensing time period of Sensor E (145). Faucet water flow is adjusted by the functioning of the pair of tertiary sensors (Sensor D and Sensor E) (114 and 115) without touching any parts of the faucet (101) (Adjust-Water-Flow-Mode) (206 and 207).

In one embodiment of the invention, when the faucet is in the Continue-Water-Flow-Mode (202), the water flow control valve assembly (Valve A) (123) is activated for water flow (301) to the faucet spout (106). When both of the secondary sensors (Sensor A and Sensor B) (112 and 113) sense the presence of an object (for example, a hand) within the detection zone (142 and 143) for a predetermined time period (Time Continue-flow-off), the logic processor (122) deactivates (301) the water flow control valve assembly (Valve B) (123) to stop continuous water flow (252) (Continue-Water-Flow-Mode) (202) (deactivation of Continue-Water-Flow Mode) (202).

In one embodiment of the invention, when the faucet (100) is in a stand-by condition, the primary sensor (Sensor C) (111) does not sense an object present within the detection zone (255), and the flow control valve assembly (Valve A) (123) is set to a deactivation condition (301) where no water flows from the faucet spout (256). Detection (142) of an object (for example, a hand or finger) within the detection zone of Sensor A (112) of the secondary sensors for a predetermined time period (Time Sc-pause) triggers the logic processor (122) to pause (257) the function of the primary sensor (Sensor C) (111), which is referred to as the "Faucet-Pause-Mode" (205). In the Faucet-Pause-Mode, a user can work within the primary sensor detection zone without activating faucet water flow for water conservation (beginning of Faucet-Pause-Mode).

In the Faucet-Pause-Mode (205), the primary sensor (Sensor C) (111) is paused (257). The Sensor A (112) of the secondary sensors detects (142) an object (for example, a hand or finger) within the detection zone for a predetermined time period (Time Sc-reset), which triggers the logic processor to reset (257) the function of the primary sensor (Sensor C) (111). The faucet system (100) is then set back to the stand-by condition (reset of Faucet-Pause-Mode) (205).

When the faucet is in the Primary-Water-Flow-Mode (201) or the Continue-Water-Flow-Mode (202), the water flow control valve assembly (Valve A) is in an activated position for water flow (301), and both the Sensor D (114) and the Sensor E (115) of the tertiary sensors sense the presence of an object (for example, a hand) within the detection zone for a predetermined time period (Time-Default-Setting). In this state the logic processor (122) sets the current temperature and flow condition as the default settings for water flow (Common-Default-Mode) (208). The Default flow and Temperature Reset function (263) prevents a user from accidently becoming injured by sudden hot water flow from a previous usage (e.g., maximum hot temperature) and maintains the faucet water flow at a minimum requirement for water conservation.

In one embodiment of the invention, the water flow control valve assembly (123) and the water temperature control valve assembly (124) has a cold fluid inlet (104), a hot fluid inlet (105) and one fluid outlet (106) conduits, combined with one or more of electric solenoid valves and electric motorized gear valves therefrom to control water flow (106) to the faucet spout.

The primary sensor (Sensor C) (111), the pair of secondary sensors (Sensor A and Sensor B) (112, 113) and the pair of tertiary sensors (Sensor D and Sensor E) (114, 115) function to fully control the water flow (301) and water temperature (302) of the touch free automatic faucet for commercial and residential applications.

FIG. 5 and FIG. 6 illustrate a faucet according to one embodiment of the invention. The sensing beam of the primary sensor C (111) is directed to the front side of the faucet (101), the pair of secondary sensors (112 and 113) and the pair of tertiary sensors (114 and 115) are mounted on different sides of the faucet body at about a 90 degree angle from the primary sensor (Sensor C) (111) to prevent interference.

FIG. 7 and FIG. 8 illustrate one embodiment of the invention having different arrangements of electronic sensors. The primary sensor (Sensor C) (111) may be installed on the outlet of faucet spout (101) for better detection according to one embodiment of the invention. It should be noted that other embodiments of the invention may have the primary sensor (Sensor C) (111) installed at other locations on the faucet spout 101.

FIG. 9 illustrates some embodiments of the invention having different arrangements of the electronic sensors. The separate faucet sensor compartment (127) design feature provides easy-access for kitchen-lavatory applications, especially for children, handicapped and elder users, etc. In one embodiment of the invention, an optional temperature display 455 is shown mounted to the top of the separate faucet sensor compartment (127). In one example, the display 455 is an LED display, an LCD display, etc. In one embodiment of the invention, the optional temperature display 455 receives a signal from the logical processor 122 based on temperature sensed by the optional water temperature sensor 119, and converts the signal to display current water temperature.

Figure 10:
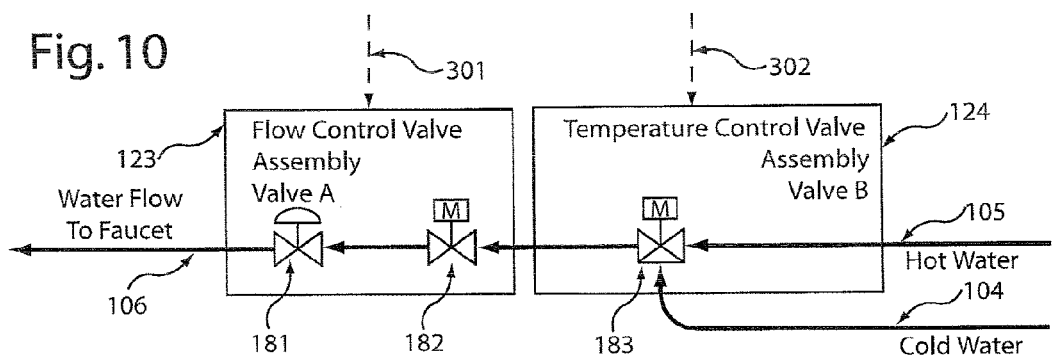
FIG. 10 illustrates a water flow control valve assembly according to one embodiment of the invention.

FIG. 10 illustrates an embodiment of the invention of the water flow control valve assembly (123) and the temperature control valve assembly (124). The flow control valve assembly (123) comprises a solenoid valve (181) and a motorized gear valve (182). The solenoid valve (181) receives a signal (301) from the logic processor to toggle on/off the valve (181) to start/stop water flow (106) to the faucet spout (101). The motorized gear valve (182) adjusts the water flow (106) according to the signal input (301). The temperature control valve assembly (124) comprises a three-way motorized gear valve (183) to adjust the cold/hot water flow ratio from the cold water inlet (104) and the hot water inlet (105) according to the input signal (302) from the output of logic processor (122).

Figure 11:
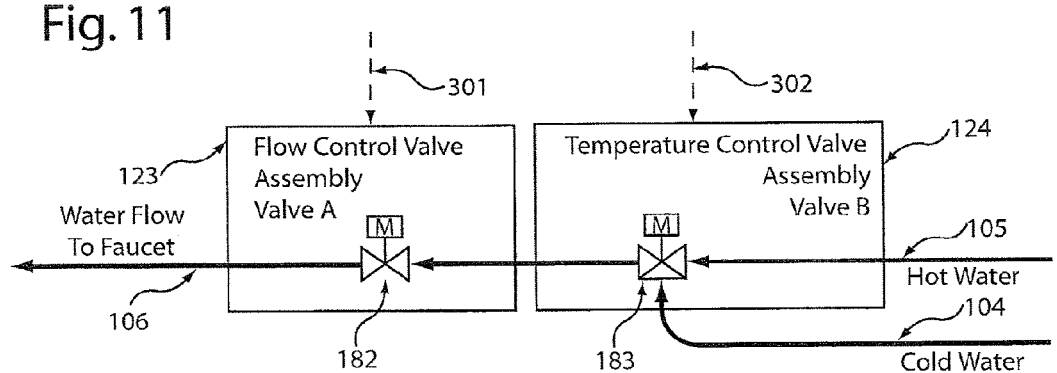
FIG. 11 illustrates another water flow control valve assembly according to one embodiment of the invention.

FIG. 11 illustrates an embodiment of the invention of the water flow control valve assembly (123) and the temperature control valve assembly (124). The flow control valve assembly (123) comprises a motorized gear valve (182). The motorized gear valve (182) adjusts the water flow (106) according to the signal input (301). The temperature control valve assembly (124) comprises a three-way motorized gear valve (183) to adjust the cold/hot water flow ratio from the cold water inlet (104) and the hot water inlet (105) according to the input signal (302) from the output of logic processor (122).

Figure 12:
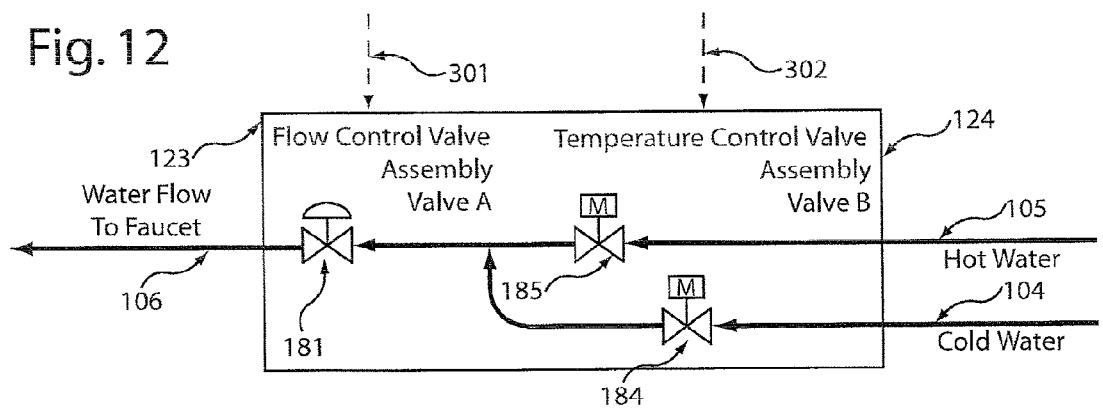
FIG. 12 illustrates yet another water flow control valve assembly according to one embodiment of the invention.

FIG. 12 illustrates a combined water flow control valve assembly (123) and a temperature control valve assembly (124) according to another embodiment of the invention. The flow/temperature control valve assembly (123 and 124) comprises a solenoid valve (181) and two motorized gear valves (184 and 185). The solenoid valve (181) receives a signal (301) from the logic processor to toggle on/off the valve (181) to start/stop water flow to faucet spout. The water flow/temperature control valve assembly (123 and 124) comprises two two-way motorized temperature control gear valves (184 and 185) to adjust the cold/hot water flow ratio from the cold water inlet (104) and the hot water inlet (105), respectively, according to the input signal (301 and 302) from the output of logic processor (122). In this embodiment of the invention, the two two-way motorized temperature control gear valves (184 and 185) control the water flow without a separate water control flow valve.

Figure 13:
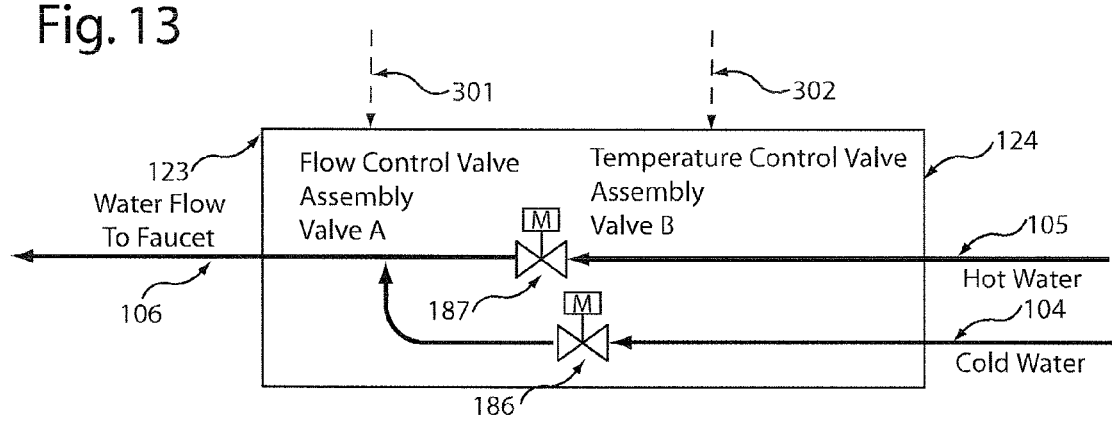
FIG. 13 illustrates still another water flow control valve assembly according to one embodiment of the invention.

FIG. 13 illustrates another water flow control valve assembly (123) and temperature control valve assembly (124) according to one embodiment of the invention. The flow/temperature control valve assembly (123 and 124) comprises two two-way motorized gear valves (186) (187) to toggle on/off, and to adjust the cold/hot water flow ratio from the cold water inlet (104) and the hot water inlet (105) according to the input signal (301 and 302) from the output of logic the processor (122).

Figure 14:
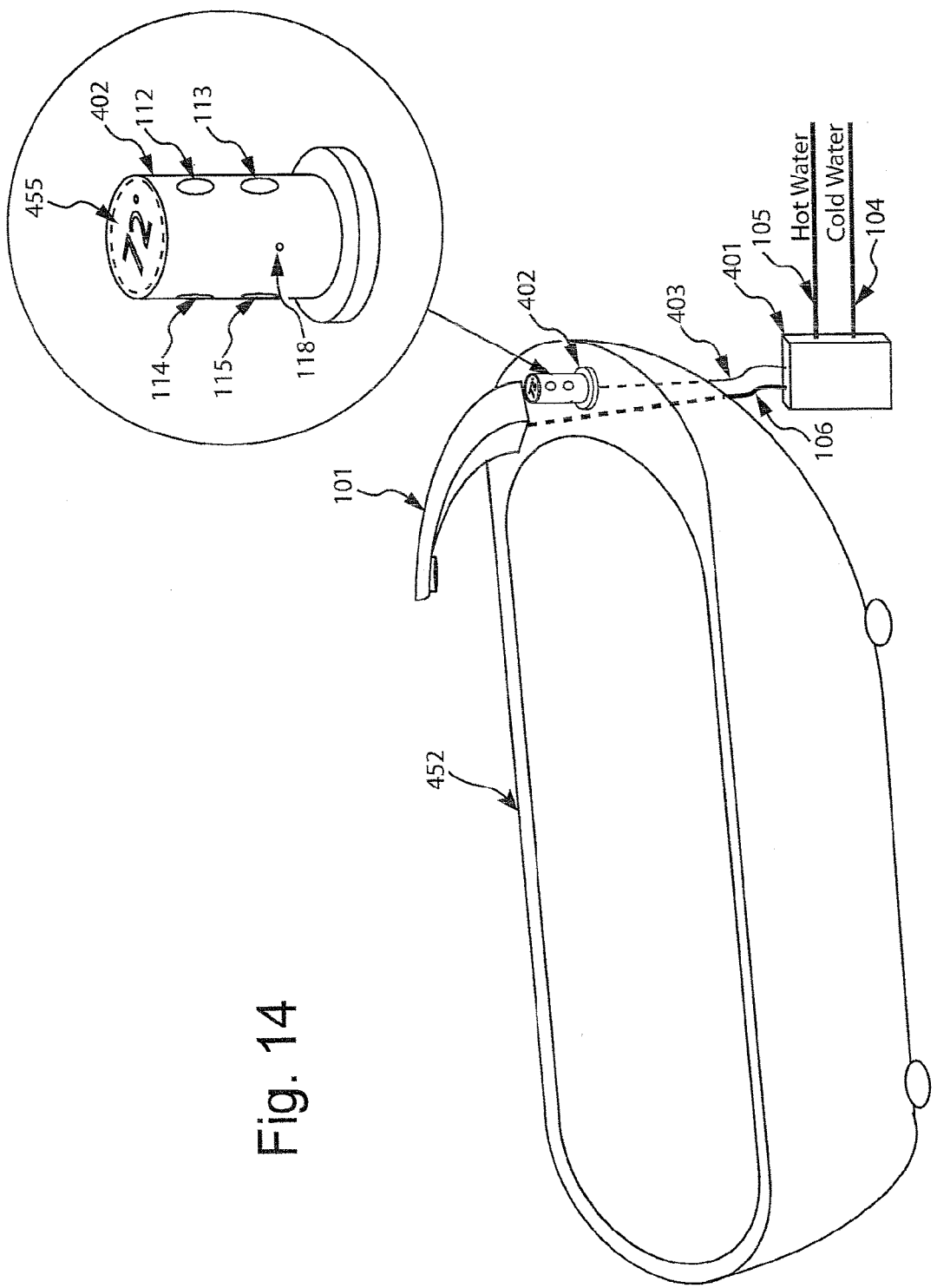
FIG. 14 illustrates a touch-free automatic faucet system adapted for a bathtub according to one embodiment of the invention.

FIG. 14 illustrates one embodiment of the invention of a touch-free automatic faucet system (100) installed with a bathtub 452. In this embodiment of the invention, the faucet spout 101 and separate faucet sensor compartment (402) are conveniently attached to the bath tub 452. A housing 401 remotely includes water flow control valve assembly (123) and temperature control valve assembly (124) and are connected with the sensors housed in separate faucet sensor compartment (402) via a wired or wireless connection 403 for communicating signals to one another. In this embodiment of the invention the faucet 101 may be turned on with continuous water flow of both secondary sensors to fill up the bathtub 452 to a desired water level at the desired temperature. In one example, the housing 401 may be installed inside a wall or next to or under the bathtub 452 for easy access for maintenance. The sensor compartment (402) includes the sensors 112, 113, 114 and 115, and LED indicator 118. In one embodiment of the invention the primary sensor C (111) is not included in the sensor compartment (402) as it is typically not necessary for a bathtub 452 to have the water flow momentarily on. It should be noted that other embodiments of the invention may include the primary sensor C (111) for bathtub applications. In some embodiments of the invention, the preset default temperatures allow users to customize the temperature settings to the desired temperature so that temperature does not have to be adjusted every time the bathtub 452 is used.

In one embodiment of the invention, a customized timer (not shown) is included for maintaining continuous water flow at the desired temperature. With this embodiment of the invention, based on the use of the bathtub 452 in the past, a user can set the timer to automatically shut the water flow off after the predetermined time limit. This embodiment of the invention allows the bathtub 452 to fill without having to watch for a desired water level to be reached. This feature allows users to do other things while the bathtub 452 is self filling at the desired temperature. In yet another embodiment, the timer and sensors are controllable via a remote control from either a handheld remote control or via a network, such as the Internet. In this embodiment of the invention, the bathtub 452 can be filled at the desired level at the desired temperature without a user having to be in the same room, or location. In still another embodiment, the timer also includes a day and time setting feature for setting the bathtub 452 to be filled in advance.

Figure 15:
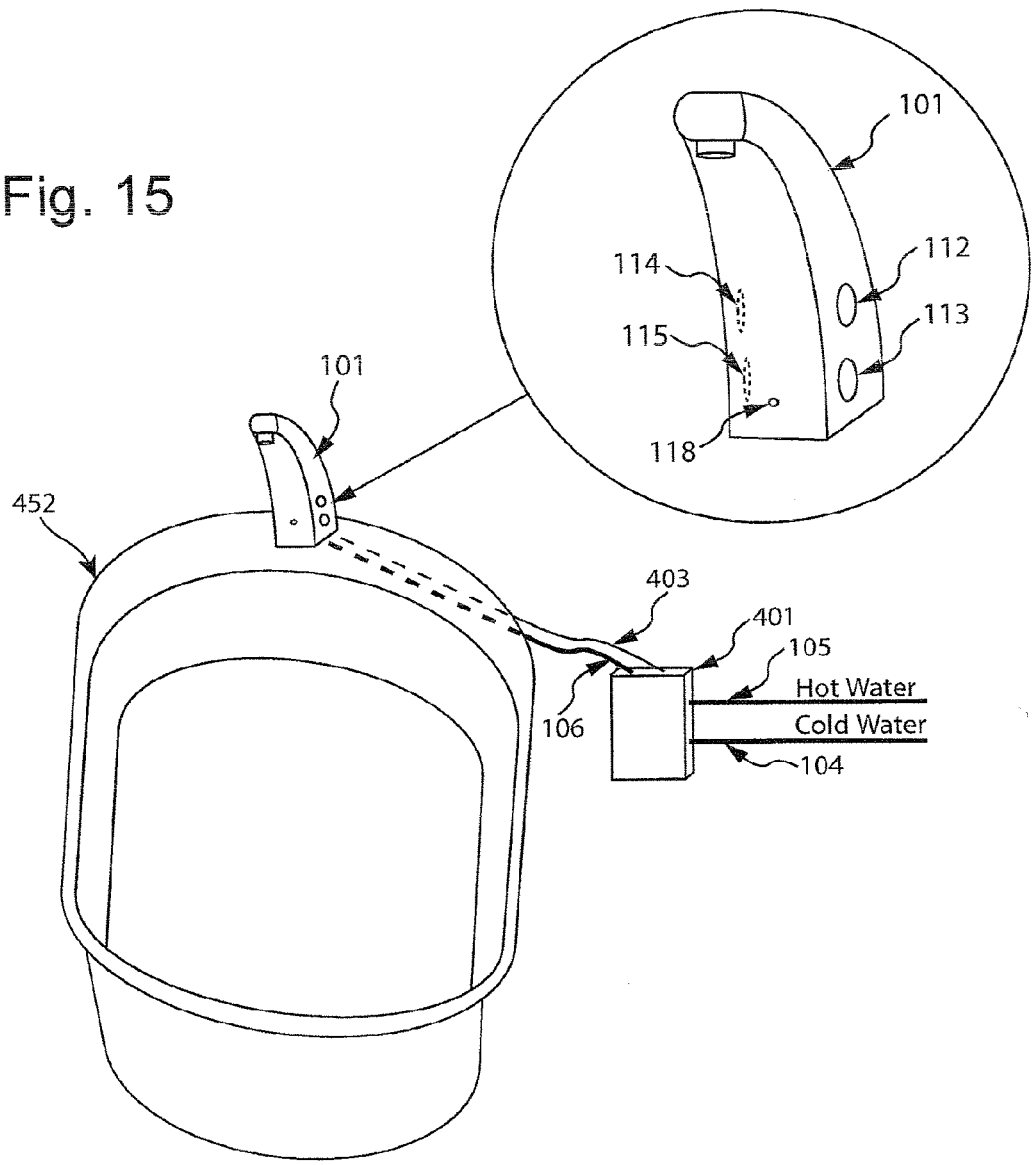
FIG. 15 illustrates another touch-free automatic faucet system adapted for a bathtub according to one embodiment of the invention.

FIG. 15 illustrates another embodiment of the invention of a touch-free automatic faucet system (100) installed with a bathtub 452 with the faucet spout 101 including the sensors 112, 113, 114 and 115, and LED indicator 118, and without the separate faucet sensor compartment (402). A housing 401 remotely includes water flow control valve assembly (123) and temperature control valve assembly (124) and are connected with the sensors housed in the faucet spout 101 via a wired or wireless connection 403 for communicating signals to one another. In this embodiment of the invention the faucet 101 may be turned on with continuous water flow of both secondary sensors to fill up the bathtub 452 to a desired water level at the desired temperature. In one example, the housing 401 may be installed inside a wall or next to or under the bathtub 452 for easy access for maintenance. One embodiment of the invention may also include the customized timer as described above. In one embodiment of the invention the primary sensor C (111) is not included in the faucet spout 111 as it is typically not necessary for a bathtub 452 to have the water flow momentarily on. It should be noted that other embodiments of the invention may include the primary sensor C (111) for bathtub applications. In some embodiments of the invention, the preset default temperatures allow users to customize the temperature settings to the desired temperature so that temperature does not have to be adjusted every time the bathtub 452 is used.

Figure 16:
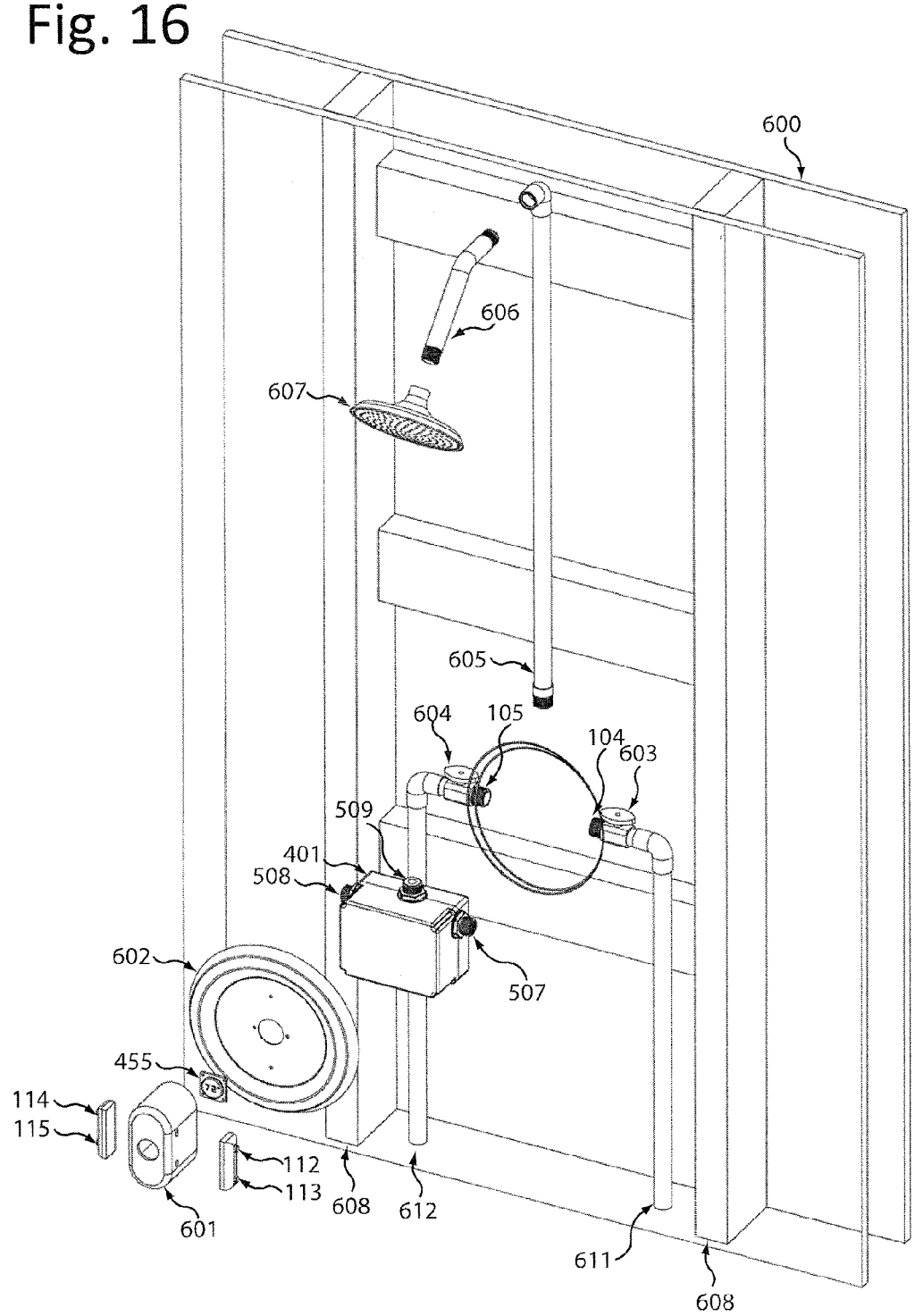
FIG. 16 illustrates a touch-free automatic faucet system adapted for a shower according to one embodiment of the invention.

FIG. 16 illustrates one embodiment of the invention of a touch-free automatic faucet system installed with a shower 600. In this embodiment of the invention, the faucet sensors 112, 113, 114, 115 and optional LED temperature display 455 are conveniently attached to the shower sensor housing 601. In one embodiment of the invention a housing 401 includes water flow control valve assembly (123) and temperature control valve assembly (124) and are connected with the sensors 112, 113, 114 and 115 via a wired or wireless connection for communicating signals to one another. In one embodiment of the invention the housing 401 is connected with the cold water valve 603 (connected to pipe 611) and the hot water valve 604 (connected to pipe 612), which are located in a wall within studs 608. In this embodiment of the invention, the water flow 106 flows into pipe 605 through the elbow joint 606 and through the spout 607. The wall plate 602 is similar to traditional wall plates. These embodiments of the invention can readily replace typical shower faucet valves.

In one embodiment of the invention the faucet 607 may be turned on with continuous water flow of both secondary sensors to run the water flow of shower 600 at the desired temperature. In one example, the housing 401 may be installed inside a wall within the same shower recess for easy access. In one embodiment of the invention the primary sensor C (111) is not included in the shower sensor housing (601) as it is typically not necessary for a shower 600 to have the water flow momentarily on. It should be noted that other embodiments of the invention may include the primary sensor C (111) for shower applications. In one embodiment, an optional timer may be included to allow a shower to be turned on ahead of time so that the temperature may reach the desired level ahead of time. In some embodiments of the invention, the preset default temperatures allow users to customize the temperature settings to the desired temperature so that temperature does not have to be adjusted every time the shower 600 is used. In another embodiment of the invention, the customized timer is used to limit time that the shower is run to conserve or limit water use.

Figure 17:
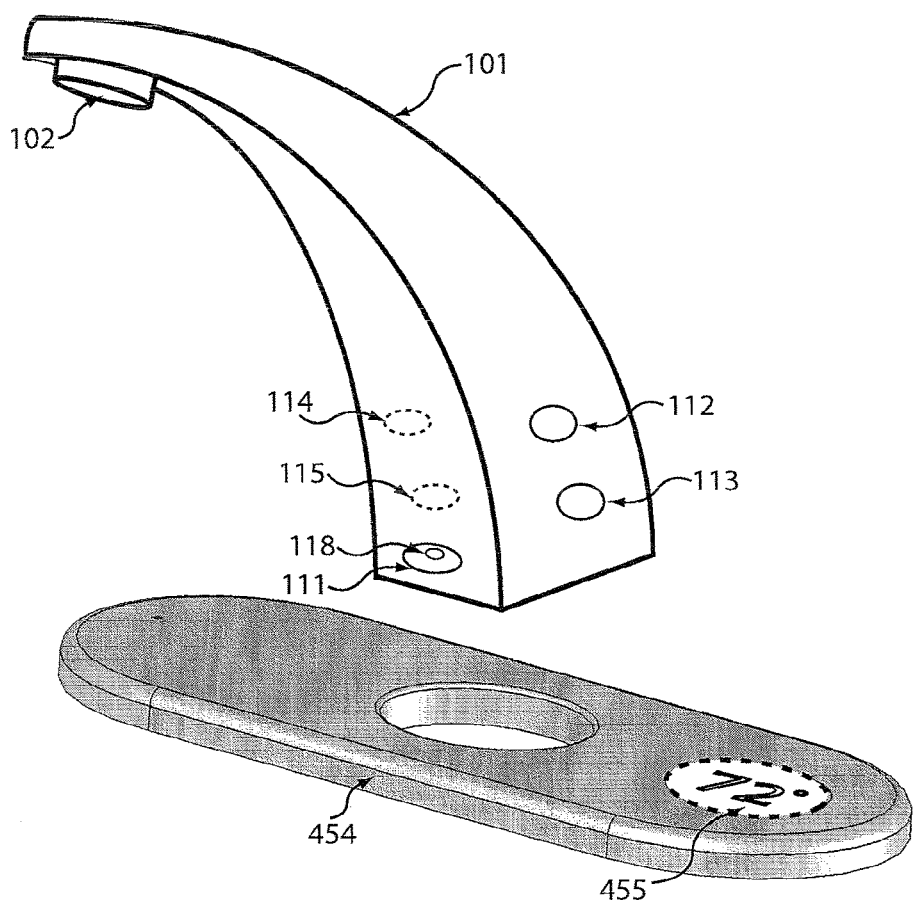
FIG. 17 illustrates a touch-free automatic faucet system with an optional temperature indicator according to one embodiment of the invention.

FIG. 17 illustrates another embodiment of the invention of a touch-free automatic faucet system (100), that may be installed with a bathtub 452 or other application, with the faucet spout 101 including the sensors 111, 112, 113, 114 and 115, and LED indicator 118, and without the separate faucet sensor compartment (402). In one embodiment of the invention, a temperature display 455 may be included in a faucet plate 454. A remote housing 401 includes water flow control valve assembly (123) and temperature control valve assembly (124) and are connected with the sensors housed in the faucet spout 101 via a wired or wireless connection 403 for communicating signals to one another. In this embodiment of the invention the faucet 101 may be turned on with continuous water flow of both secondary sensors to fill up the bathtub 452 to a desired water level at the desired temperature. One embodiment of the invention may also include the customized timer as described above. In some embodiments of the invention, the preset default temperatures allow users to customize the temperature settings to the desired temperature so that temperature does not have to be adjusted every time the faucet 101 is used.

Figure 18:
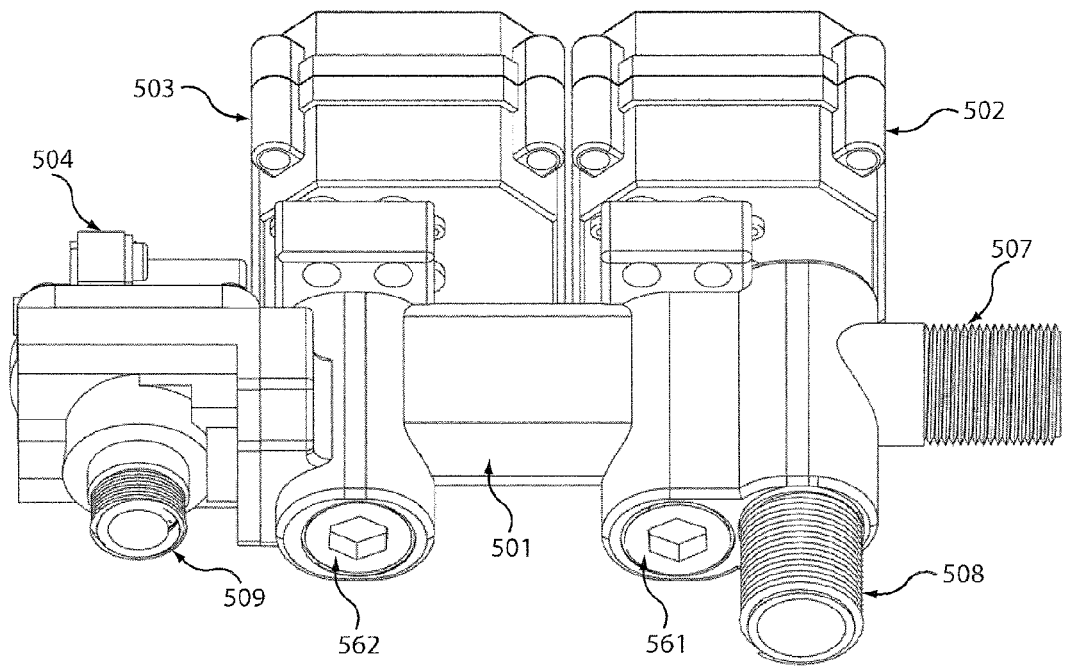
FIG. 18 illustrates a water flow and temperature control valve assembly according to one embodiment of the invention.

FIG. 18 illustrates an embodiment of the invention of a motorized gear housing (503) for a water flow control valve assembly and a motorized gear housing (502) for a temperature control valve assembly. The water flow control valve housing (501) is connected with a solenoid valve housing (504). A cold water inlet connecter 507, hot water inlet connector 508 and water outlet connector 509 are also shown. The water flow housing 501 houses the flow and the temperature control valves. Two valve stem plugs (561) (562) are to seal the valve stem housing.

FIG. 19A illustrates a top view of the embodiment shown in FIG. 18. A cold water inlet connecter 507, hot water inlet connector 508 and water outlet connector 510 are also shown. The water flow housing 501 houses the flow and temperature control valves to the water control valve. The bracket portion 540 of the motorized gear housing (503) for a water flow control valve assembly and a bracket portion 539 of the motorized gear housing (502) for a temperature control valve assembly are also shown. The gear motors (502) and (503) control movement of valve stems 505 and 506 (see FIG. 20).

Valve stem housing 537 and 538 of the respective housings 502 and 503 are also illustrated.

FIG. 19B illustrates a side view of the embodiment shown in FIG. 18. As shown, the cold water inlet connecter 507 is connected with a conduit 531, and the hot water inlet connector 508 is connected with a conduit 533. The temperature valve 505 (see FIG. 20) adjusts the water flow from the conduits 531 and 533 and the water flows through the temperature valve housing 535 that mixes cold and hot water, and out through outlet conduits 532 and 534. The water control valve 506 (see FIG. 20) adjusts the water flow and the water flows out from the outlet conduit 510. Threads (567) (568) are to seal the valve stem plugs.

Figure 20:
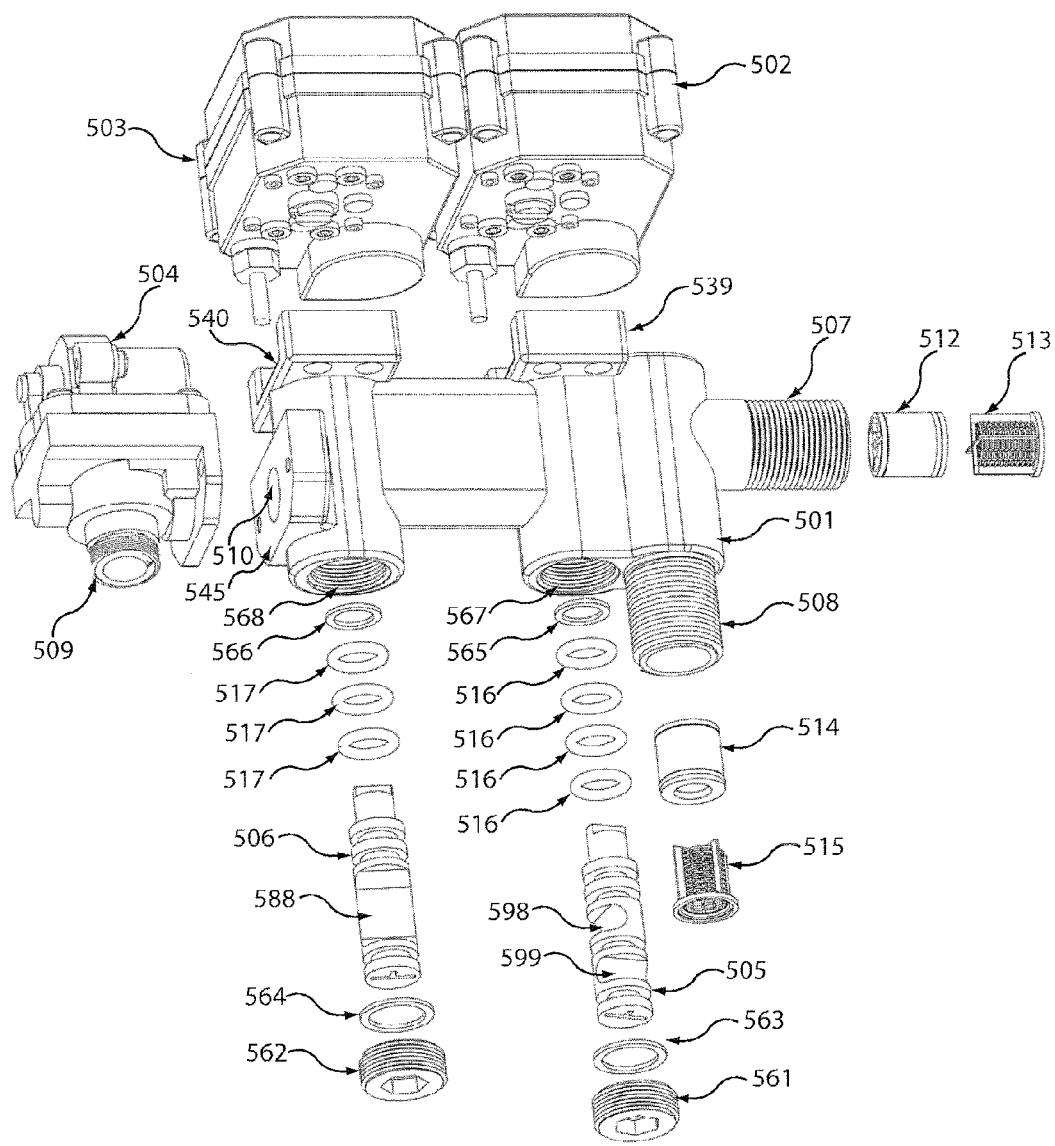
FIG. 20 illustrates an exploded view of the water flow and temperature control valve assembly shown in FIG. 18 according to one embodiment of the invention.

FIG. 20 illustrates an exploded view of the embodiment shown in FIG. 18. The flow control valve assembly gear housing (503), the temperature control valve gear housing (502) and the connected solenoid valve housing (504) are shown with internal components as follows. Inlet water filter 513 connects internally with a check valve 512 within the cold water inlet 507. Inlet water filter 515 connects internally with a check valve 514 within the hot water inlet 508. The check valves 512 and 514 prevent or reduce water backflow from the inlet connectors 507 and 508. The temperature valve assembly includes the rotating valve stem 505 that includes cold water control opening 598, hot water control opening 599. The temperature control valve including the temperature control valve 505 is a three-way valve, where cold water flows through the cold water control opening (598), the hot water flows through the hot water control opening 599, and adjusted water flows through the outlet conduit (532) (534) to flow control valve housing (536). O-rings (516) are included to prevent leaks between the hot and cold water and to reduce wear. Gasket (563) (565) and valve stem plugs (561) are to seal the valve stem housing.

The water flow valve assembly includes the rotating valve stem 506 that includes water control opening 588. O-rings 517 are included to prevent leaks and reduce wear. The water flow valve is a two way valve. Gasket (564) (566) and valve stem plugs (562) are to seal the valve stem housing.

The motor in the temperature control valve gear housing (502) turns a gear that connects with the top portion of the temperature valve stem 505. As the signals are received from the logical processor 122 (from the temperature sensors), the motor turns the temperature valve stem 505 and rotates it to adjust the size of the cold water control opening 598 and hot water control opening 599. The hot and cold water are limited to flow by the blockage of the water openings (598 and 599) against the temperature valve housing 535.

As the signals are received from the logical processor 122 (from the water flow control sensors), the motor turns the flow valve stem 506 and rotates it to adjust the size of the water flow control opening 588 against the water flow control housing 536. The signals received from the logical processor 122 (from the primary sensor C (111)) control the solenoid in the solenoid valve housing 504 that open or close the flow from valve housing (501). If the solenoid valve (504) is closed, no water will flow to water outlet connector 509. If the solenoid valve (504) is open, the water will flow through the water outlet connector 509.

Figure 21:
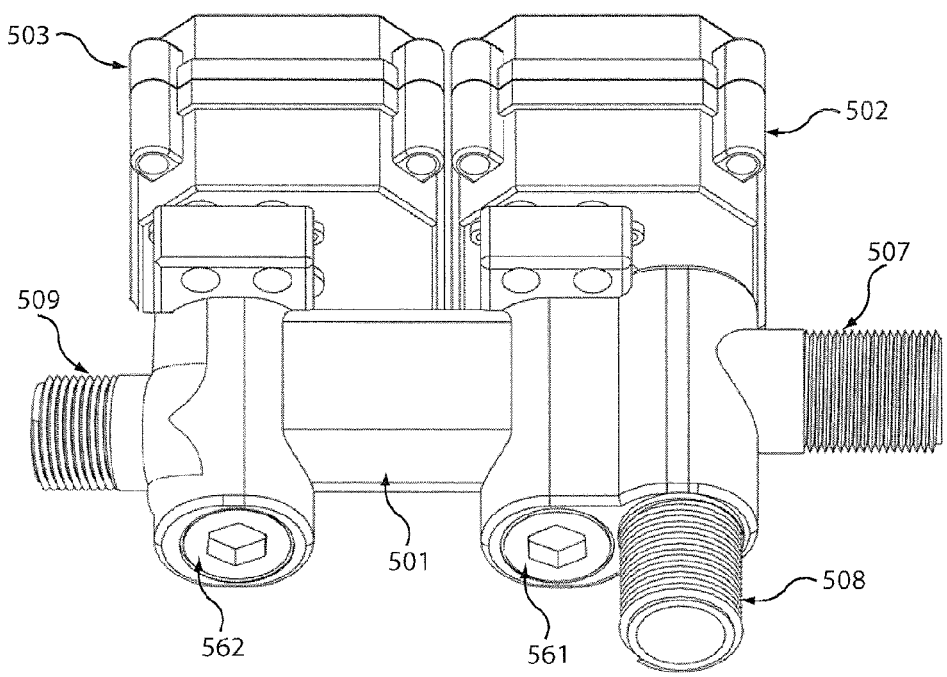
FIG. 21 illustrates another water flow and temperature control valve assembly according to one embodiment of the invention.

FIG. 21 illustrates an embodiment of the invention of a motorized gear housing (503) for a water flow control valve assembly and a motorized gear housing (502) for a temperature control valve assembly. In this embodiment of the invention, the flow control valve assembly gear housing (503) includes the water outlet connector 509. A cold water inlet connecter 507, hot water inlet connector 508 are also shown. The water flow housing 501 houses the flow and temperature control valves. These embodiments are suited for bathtub and shower use where the primary sensor C (111) is not necessary as the water flow will be continuous.

Figure 22A:
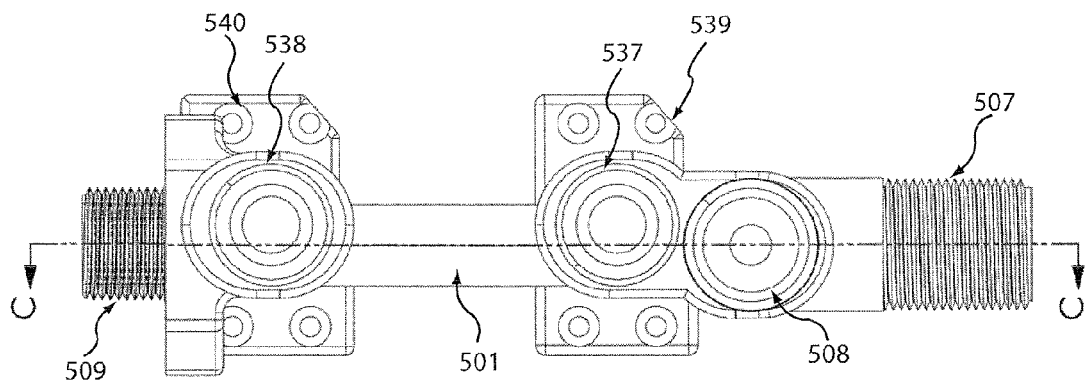
FIG. 22A illustrates a top interior view of the water flow and temperature control valve assembly shown in FIG. 21 according to one embodiment of the invention.

FIG. 22A illustrates a top view of the embodiment shown in FIG. 21. A cold water inlet connecter 507, hot water inlet connector 508 and water outlet connector 509 are also shown. The water flow housing 501 houses the flow and temperature control valves. The bracket portion (540) to connect the motorized gear housing (503) for a water flow control valve assembly and a bracket portion (539) to connect the motorized gear housing (502) for a temperature control valve assembly are also shown.

Figure 22B:
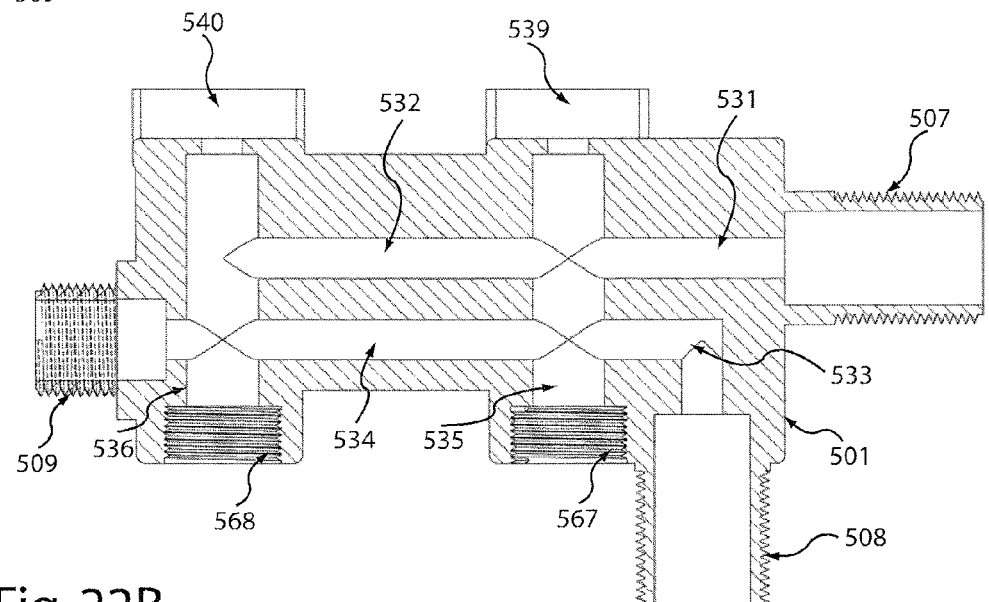
FIG. 22B illustrates a side interior view of another water flow and temperature control valve assembly shown in FIG. 21 according to one embodiment of the invention.

FIG. 22B illustrates a side view of the embodiment shown in FIG. 21. As shown, the cold water inlet connecter 507 is connected with a conduit 531, and the hot water inlet connector 508 is connected with a conduit 533. The temperature valve stem 505 adjusts the water flow from the conduits 531 and 533 and the water in the temperature valve housing 535, and flows out through outlet conduits 532 and 534 to the water control valve housing 536. The water control valve 506 (see FIG. 23) adjusts the water flow and the water flows out from the outlet conduit 510. Threads (567) (568) function to seal the valve stem plugs.

Figure 23:
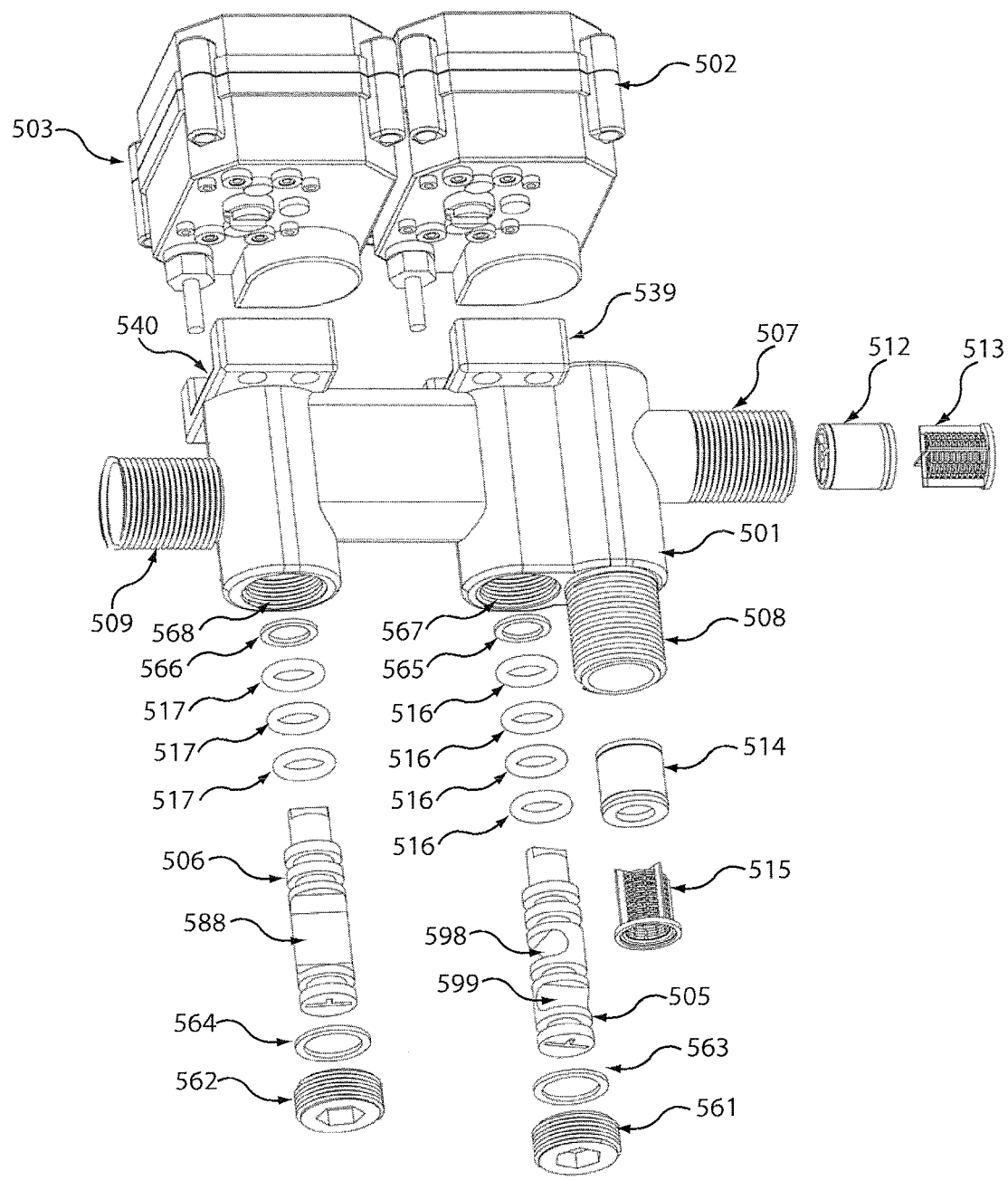
FIG. 23 illustrates an exploded view of the water flow and temperature control valve assembly shown in FIG. 21 according to one embodiment of the invention.

FIG. 23 illustrates an exploded view of the embodiment shown in FIG. 21. The flow control valve assembly gear housing (503) and the temperature control valve gear housing (502) are shown with internal components as follows. Inlet water filter 513 connects internally with a check valve 512 within the cold water inlet 507. Inlet water filter 515 connects internally with a check valve 514 within the hot water inlet 508. The check valves 512 and 514 prevent or reduce water backflow from the inlet connectors 507 and 508. The temperature valve assembly includes the rotating valve stem 505 that includes cold water control opening 598, hot water control opening 599. The temperature control valve including the temperature control valve 505 is a three-way valve, where cold water flows through the cold water control opening, the hot water flows through the hot water control opening 599, and adjusted water flows to the flow control valve stem. O-rings 516 are included to prevent leaks between the hot and cold water and to reduce wear. Gasket (563) (565) and valve stem plugs (561) function to seal the valve stem housing.

The water flow valve assembly includes the rotating valve stem 506 that includes water control opening 588. O-rings 517 are included to prevent leaks and reduce wear. Gasket (564) (566) and valve stem plugs (562) function to seal the valve stem housing. In one embodiment of the invention, the water flow valve is a two way valve.

The motor in the temperature control valve gear housing (502) turns a gear that connects with the top portion of the temperature valve stem 505. As the signals are received from the logical processor 122 (from the temperature sensors), the motor turns the temperature valve stem 505 and rotates it to adjust the size of the cold water control opening 598 and hot water control opening 599. The hot and cold water are limited to flow by the blockage of the water openings (598 and 599) against the temperature valve housing 535.

As the signals are received from the logical processor 122 (from the water flow control sensors), the motor turns the flow valve stem 506 and rotates it to adjust the size of the water flow control opening 588 against the water flow control housing 536. The water than either flows or doesn't flow based on the signals received from the logical processor 122 that control the flow control valve stem 506. In another embodiment of the invention, the signals from the logical processor 122 (from the temperature sensors) controls the on/off of the water flow. The water output directly flows out from the flow control valve assembly to the water outlet connector 509.

Figure 24:
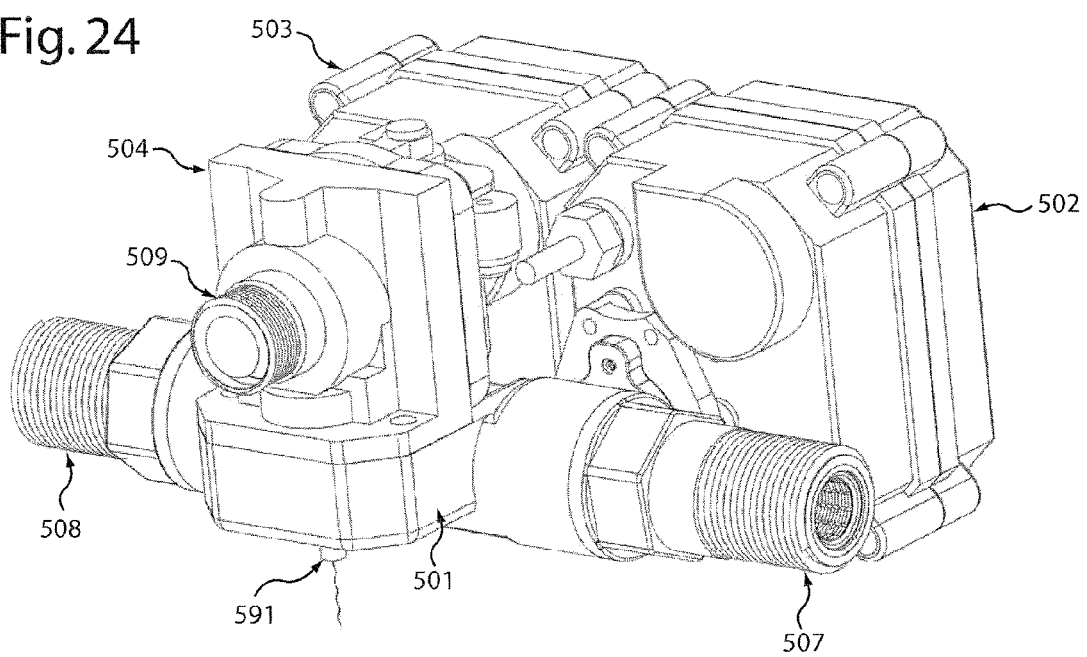
FIG. 24 illustrates yet another water flow and temperature control valve assembly according to one embodiment of the invention.

FIG. 24 illustrates an embodiment of the invention of a motorized gear housing (503) for a hot water two-way flow control valve assembly and a motorized gear housing (502) for a cold water two-way flow control valve assembly. The water flow housing (501) for a hot water two-way flow control valve assembly and a cold water two-way flow control valve assembly are connected with a solenoid valve housing (504). A cold water inlet connecter 507, hot water inlet connector 508 and water outlet connector 509 are also shown. A water temperature sensor (591) at the mixed water conduit is also shown.

FIG. 25A illustrates a top view of the embodiment shown in FIG. 24. A cold water inlet connecter 507 on the valve body nut (585C), hot water inlet connector 508 on the valve body nut (585H) and water outlet conduit (510) are also shown. The water flow housing 501 houses the flow from the temperature control valves. The bracket portion 539 for the motorized gear housing (502) for the cold water flow control valve assembly and a bracket portion 540 for the motorized gear housing (503) for the hot water flow control valve assembly are also shown. Valve housing 537 and 538 of the respective valves are also illustrated.

FIG. 25B illustrates a side view of the embodiment shown in FIG. 24. As shown, the cold water inlet connecter 507 on the valve body nut (585C) is connected with the valve housing (535) by the threads (586C), and the hot water inlet connector 508 on the valve body nut (585H) is connected with the valve housing (536) by the threads (586H). The cold temperature flow valve 505 (see FIG. 26) adjusts the water flow in the valve housing (535), the hot temperature flow valve 506 (see FIG. 26) adjusts the water flow in the valve housing (536). Cold water and hot water flow through the ball valve conduit (532) and (534) to the mixing conduit (510) and to the solenoid valve (504).

Figure 26:
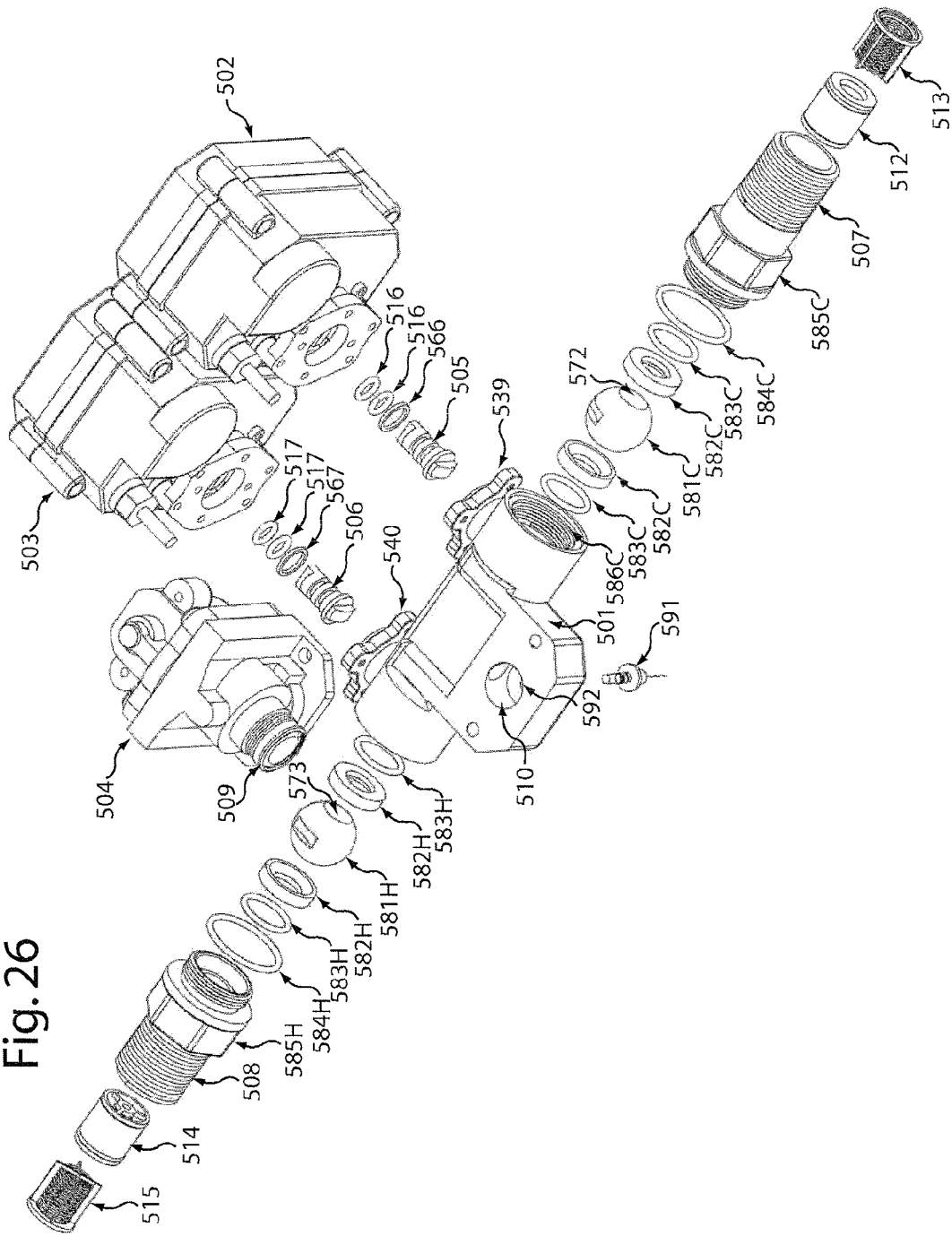
FIG. 26 illustrates an exploded view of the water flow and temperature control valve assembly shown in FIG. 24 according to one embodiment of the invention.

FIG. 26 illustrates an exploded view of the embodiment shown in FIG. 24. The motorized gear housing (503) for a hot water two-way flow control valve assembly, the motorized gear housing (502) for a cold water two-way flow control valve assembly and the connected solenoid valve housing (504) are shown with internal components as follows. Inlet cold water filter 513 connects internally with a check valve 512 within the cold water inlet 507. Inlet hot water filter 515 connects internally with a check valve 514 within the hot water inlet 508. The check valves 512 and 514 prevent or reduce water backflow from the inlet connectors 507 and 508. The cold water flow valve assembly includes the rotating valve stem 505, the valve seals (582C) (583C) (584C) and a rotation ball (581C) that includes a cold water control opening 572. The hot water flow valve assembly includes the rotating valve stem 506, the valve seals (582H) (583H) (584H) and a rotation ball (581H) that includes a hot water control opening 573. The cold temperature water flow valve assembly including the cold water rotating stem valve 505 and the ball (581C) is a two-way valve, where cold water flows in from the cold water inlet connector 507 through the cold water control opening 572, and out to the solenoid valve (504). The hot temperature water flow valve assembly including the hot water rotating stem valve 506 and the ball (581H) is a two-way valve, where hot water flows in from the hot water inlet connector 508 through the hot water control opening 573, and out to the solenoid valve (504). O-rings (516) (517) and gaskets (566) (567) are included to prevent leaks and to reduce wear for the respective rotating stem valves 505 and 506. The two valve stems can be a cylinder type or ball valve type.

The motor in the motorized gear housing (502) for a cold water two-way flow control valve assembly turns a gear that connects with the top portion of the temperature valve stem 505. As the signals are received from the logical processor 122 (from the temperature sensors), the motor turns the valve stem 505 and rotates it to adjust the size of the cold water control opening 572, and the motor from the motorized gear housing (503) for a hot water two-way flow control valve assembly turns a gear that connects with the top portion of the valve stem 506. The hot and cold water are limited to flow by the blockage of the water openings (572 and 573) against the respective housings 535 and 536. As the adjusted hot and cold water flow through the water openings (572 and 573), the flows are mixed in the mixing water conduit (510) of water flow housing (501) and exit from outlet (509) through the solenoid valve (504). The water temperature sensor (591) is housed in the temperature sensor housing (592) to detect the mixed water temperature.

The signals received from the logical processor 122 (from the primary sensor C) (111)) control the solenoid in the solenoid valve housing 504 that open or close the flow valve. If the flow valve is closed, no water will flow to water outlet connector 509. If the flow valve is open, the water will flow through the water outlet connector 509.

Figure 27:
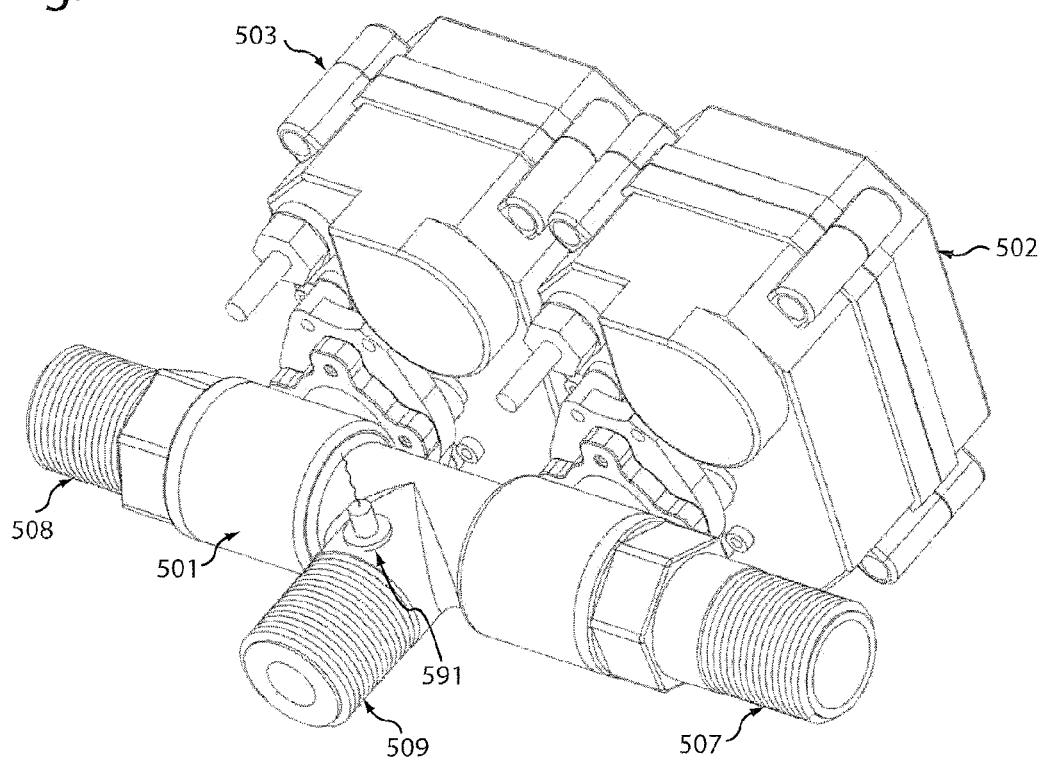
FIG. 27 illustrates still another water flow and temperature control valve assembly according to one embodiment of the invention.

FIG. 27 illustrates an embodiment of the invention of a motorized gear housing (503) for a hot water two-way flow control valve assembly and a motorized gear housing (502) for a cold water two-way flow control valve assembly. A cold water inlet connecter 507, hot water inlet connector 508 and water outlet connector 509 are also shown. The water flow housings 501 houses the flow from the temperature control valves. A water temperature sensor (591) is housed in the temperature sensor housing (592) to detect the mixed water temperature.

In this embodiment of the invention, the hot and cold water control valves control the water flow out of the water outlet connector 509 for continuous flow applications, such as with bathtubs and showers.

Figure 28A:
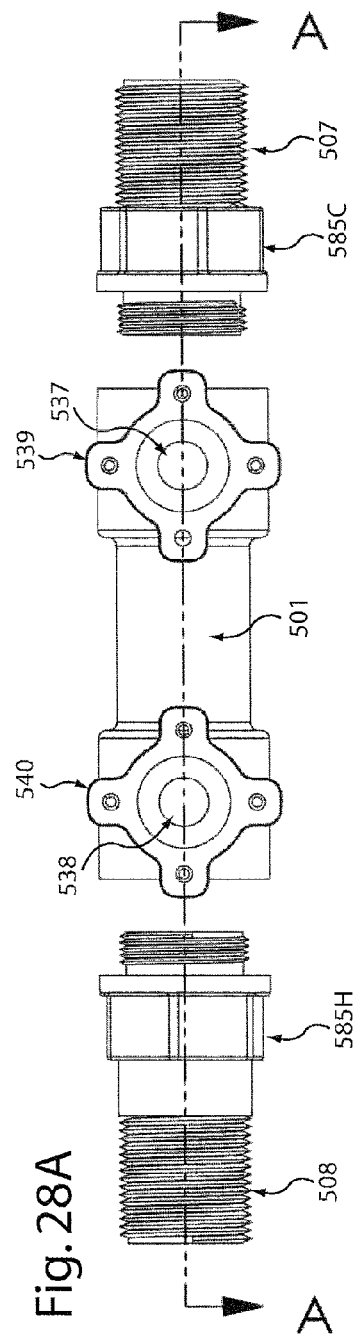
FIG. 28A illustrates a top interior view of the water flow and temperature control valve assembly shown in FIG. 27 according to one embodiment of the invention.

FIG. 28A illustrates a top view of the embodiment shown in FIG. 27. A cold water inlet connector 507 on the valve body nut (585C), hot water inlet connector 508 on the valve body nut (585H) and water outlet conduit (510) are also shown. The water flow housing 501 houses the flow from the temperature control valves to the mixing conduit 510. The bracket portion 539 for the motorized gear housing (502) for the cold water flow control valve assembly and a bracket portion 540 for the motorized gear housing (503) for the hot water flow control valve assembly are also shown. Valve housing 537 and 538 of the respective valves are also illustrated.

Figure 28B:
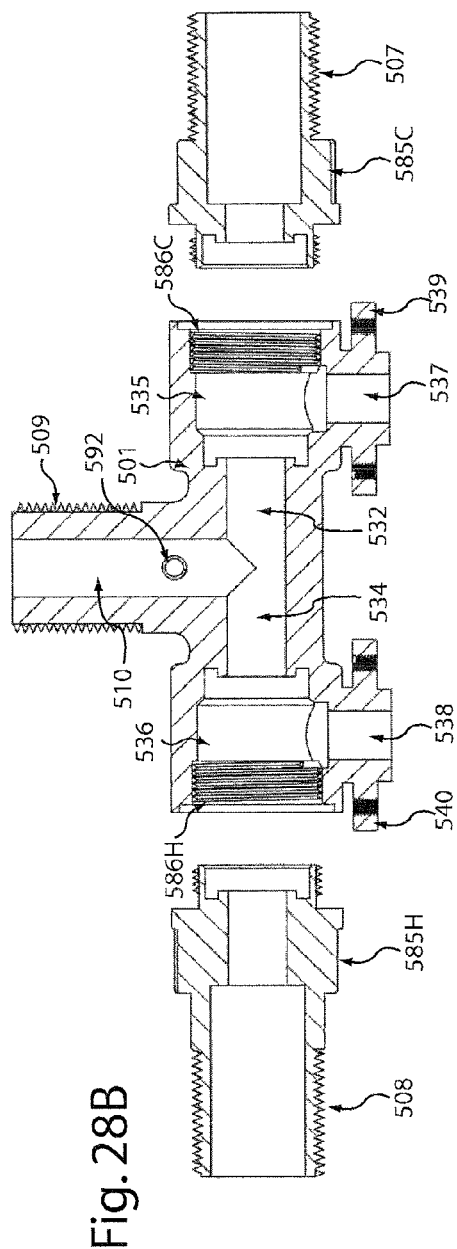
FIG. 28B illustrates a side interior view of another water flow and temperature control valve assembly shown in FIG. 27 according to one embodiment of the invention.

FIG. 28B illustrates a side view of the embodiment shown in FIG. 27. As shown, the cold water inlet connector 507 on the valve body nut (585C) is connected with the valve housing (535) by the threads (586C), and the hot water inlet connector 508 on the valve body nut (585H) is connected with the valve housing (536) by the threads (586H). The cold temperature flow valve 505 (see FIG. 26) adjusts the water flow in the valve housing (535), the hot temperature flow valve 506 (see FIG. 29) adjusts the water flow in the valve housing (536), and the water mixes in the mixing conduit 510, and out through water outlet connector 509.

Figure 29:
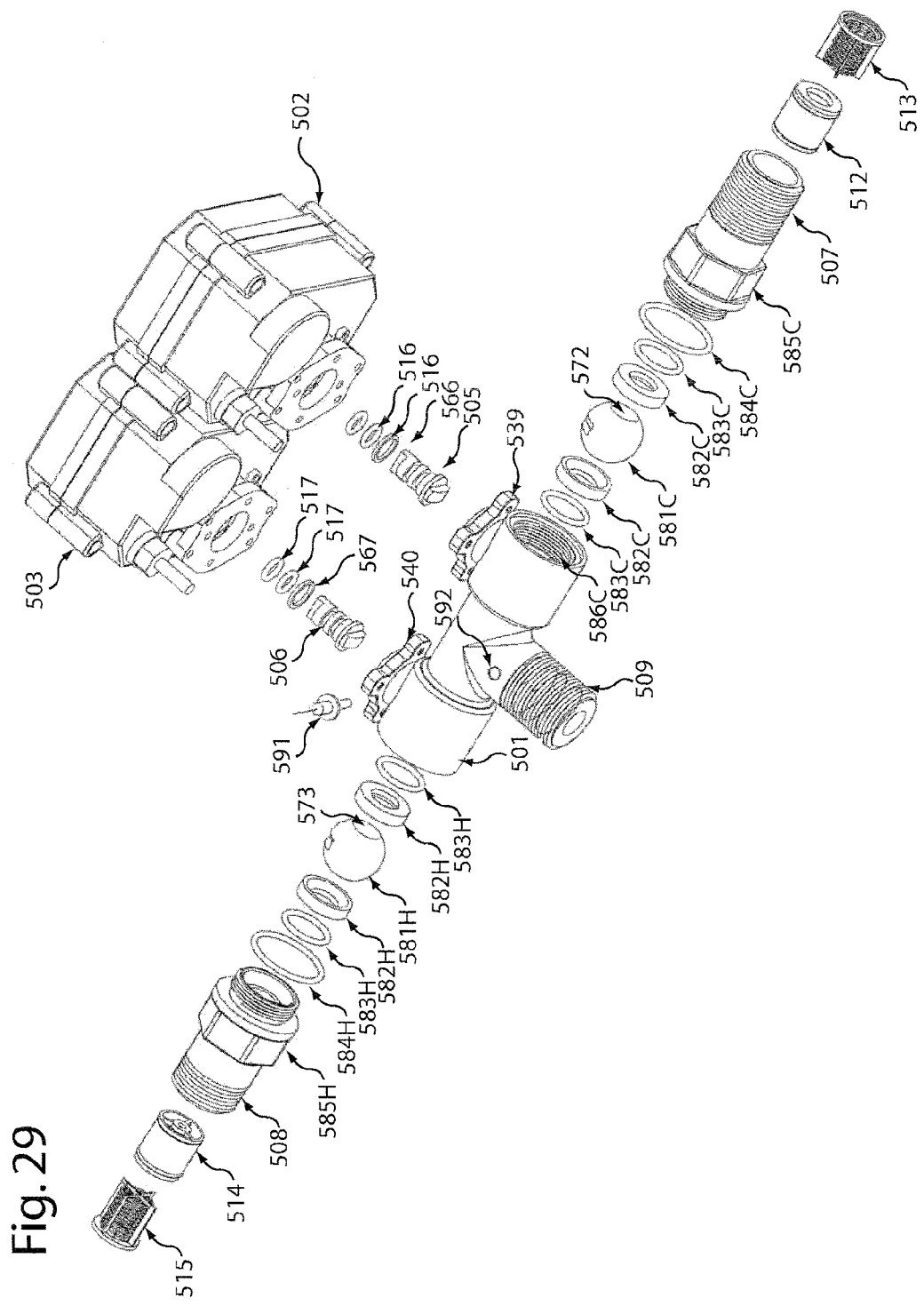
FIG. 29 illustrates an exploded view of the water flow and temperature control valve assembly shown in FIG. 27 according to one embodiment of the invention.

FIG. 29 illustrates an exploded view of the embodiment shown in FIG. 27. The motorized gear housing (503) for a hot water two-way flow control valve assembly and the motorized gear housing (502) for a cold water two-way flow control valve assembly are shown with internal components as follows. Inlet cold water filter 513 connects internally with a check valve 512 within the cold water inlet 507. Inlet hot water filter 515 connects internally with a check valve 514 within the hot water inlet 508. The check valves 512 and 514 prevent or reduce water backflow from the inlet connectors 507 and 508. The cold water flow valve assembly includes the rotating valve stem 505 that includes a cold water control opening 572. The hot water flow valve assembly includes the rotating valve stem 506 that includes a hot water control opening 573. The cold temperature water flow valve assembly including the cold water rotating stem valve 505 is a two-way valve, where cold water flows in from the cold water inlet connector 507 through the cold water control opening 572 of ball valve body (581C), and out to the mixing conduit 510. The hot temperature water flow valve assembly including the hot water rotating stem valve 506 is a two-way valve, where hot water flows in from the hot water inlet connector 508 through the hot water control opening 573 of ball valve body (581H), and out to the mixing conduit 510. The valve seals (582C) (583C) (584C) (582H) (583H) and (584H) function to seal the ball stems. O-rings rings (516) (517) and gaskets (566) (567) are included to prevent leaks and to reduce wear for the respective rotating stem valves 505 and 506. The two valve stems can be a cylinder type or ball valve type. The water temperature sensor (591) is housed in the temperature sensor housing (592) to detect the mixed water temperature.

The motor in the motorized gear housing (502) for a cold water two-way flow control valve assembly turns a gear that connects with the top portion of the temperature valve stem 505. As the signals are received from the logical processor 122 (from the temperature sensors), the motor turns the valve stem 505 and rotates it to adjust the size of the cold water control opening 572, and the motor from the motorized gear housing (503) for a hot water two-way flow control valve assembly turns a gear that connects with the top portion of the valve stem 506. The hot and cold water are limited to flow by the blockage of the water openings (572 and 573) against the respective housings 535 and 536. As the adjusted hot and cold water flow through the water openings (572 and 573), the flows are mixed in the mixing conduit 510, and out through water outlet connector (509).

As the signals are received from the logical processor 122 (from the water flow control sensors), the motor turns the temperature valve stem 506 and rotates it to adjust the size of the water flow control opening 573 against the water flow control housing 536. The water than either flows or doesn't flow based on the signals received from the logical processor 122 that control the flow control valve stem 506. In another embodiment of the invention, the signals from the logical processor 122 (from the temperature sensors) controls the on/off of the water flow. The water output directly flows out from the flow control valve assembly to the water outlet connector 509.

FIG. 30 illustrates an internal view, and FIG. 31 illustrates an exploded view of a touch-free automatic faucet system according to one embodiment of the invention. In this embodiment of the invention, the faucet spout 101 is shown with the sensor assemblies shown having a shape congruent to the faucet spout 101 body shape. The sensor assemblies 112, 113, 114, 115 and 111 shaped with an angled portion that is forced against the faucet spout 101 body via a sensor holding element 471. In one embodiment of the invention the sensors are aligned to matched windows or openings. In this embodiment, the sensor 112 is matched with window/opening 112a; the sensor 113 is matched with window/opening 113a; the sensor 111 is matched with window/opening 111a; the sensor 114 is matched with window/opening 112a; and the sensor 115 is matched with window/opening 113a. It should be noted that these embodiments allow the sensors 112/113 and 114/115 to be interchanged on either side of the faucet spout body 101 through windows/openings 112a/113a on both sides of the faucet spout 101 body. In one embodiment a securing nut 472 applied to shaft 470 is used to tighten the sensor holding element 471.

The various embodiments of the invention provide a touch-free automatic faucet with three or more sensors to control water flow and temperature for commercial and residential applications for easy and convenient operation, water conservation, and personal hygiene protection.

In one embodiment of the invention the sensors A, B, C, D and E have a sensing range from 0.1 inch to 36 inches. In one example, Sensor A, B, D and E will be in the range of 0.1 to 10 inches, whereas the Sensor C will have a range of 0.1 to 36 inches. In one embodiment of the invention, the sensing range is set during manufacturing depending upon use (e.g., commercial, home, based on a handicap, based on age of typical users, etc.). In another embodiment of the invention, the range may be adjusted by an installer.

In one embodiment of the invention, the distance between the pair of secondary sensors (Sensor A and Sensor B) ranges from about 0.1 inch to 6 inches, depending upon the application and size of faucet. In one example, a preferred distance ranges from 1 to 2.5 inches. In another embodiment of the invention, the distance between the pair of third sensors (Sensor D and Sensor E) may range from about 0.1 to 6 inches. In one example, a preferred distance ranges from 1 to 2.5 inches. In another example, there are no distance limitation between the pair of secondary (Sensor A and Sensor B) and the pair of third sensors (Sensor D and Sensor E). In another embodiment of the invention, the sensing range is adjusted depending on the faucet design.

According to an embodiment of the invention, according to the logic program, coverage of the pair of the Sensor A and Sensor B by an object (e.g., a person's hand(s)) will turn on or off the Continuous-Flow-Mode 202 depending on the current faucet condition/mode. In one example, the action of a hand covering both of the Sensor D and Sensor E will activate the Default-Flow-Temperature-Mode 208 and set the current faucet condition as the default condition.

In one embodiment of the invention, the predetermined time periods for the sensors may vary. In one example, the predetermined time periods range from 0.1 to 360 seconds for all the logic functions. In another example, the preferred predetermined time period of each function is set based on the specific applications (e.g., commercial, industrial, home, targeted user, etc.). In one embodiment of the invention, there are default predetermined time periods for each function (e.g., raise/lower temperature, increase/decrease flow, on/off, continuous flow, etc.). In one embodiment of the invention, the predetermined time periods are set during manufacturing depending upon use (e.g., commercial, industrial, home, based on a handicap, based on age of typical users, etc.). In another embodiment of the invention, the predetermined time periods may be adjusted by an installer.

In one embodiment of the invention, the automatic touch free faucet is operated at a low voltage to prevent shock. In one embodiment of the invention, the whole faucet system uses low voltage direct current (e.g., 3 volt or 24 volt), so there is no concern about harm from electric shock. In one embodiment of the invention, batteries can be used for operating the sensors and other electrical and electronic components. In this embodiment of the invention, a low battery signal alerts the user(s) so that the battery(ies) can be changed before failure, such as a sound alert, a light alert (e.g., LED signal), both sound and light, etc.).

In one embodiment of the invention, the faucet is set to a factory default temperature range of about 55° to 120° F., depending on the geologic market area for comfort usages, type of use (e.g., commercial, industrial, home, targeted users, etc.). In one example, users may change the default to a personal (i.e., favorite) default temperature and flow at their preference by covering both the Sensor D and Sensor E of the third pair sensors for a time period referred as the Default-Flow-Temperature-Mode when the faucet water is in their favorite flowing condition. In one embodiment of the invention, the default temperature range is set during manufacturing depending upon use (e.g., commercial, home, based on a handicap, based on age of typical users, etc.). In another embodiment of the invention, the default temperature range may be adjusted by an installer, or the user.

In one embodiment of the invention, the time period related to increasing/decreasing temperature is dependent on the pressure and temperature of both the hot and cold water supply. In one example, a convenient adjusting speed for temperature and flow is set so that the increase/decrease in temperature does not change at an inconvenient rate (e.g., too fast, too slow, etc.). In one embodiment of the invention, the temperature and flow adjustment rates are set during manufacturing depending upon use (e.g., commercial, home, based on a handicap, based on age of typical users, etc.). In another embodiment of the invention, the adjustment rates may be adjusted by an installer.

In one embodiment of the invention the sensors A, B, C, D and E are single IR sensors. In one embodiment of the invention, the IR sensors have varying wave length and emitting angles for various applications. In one embodiment, the sensing angle range is adjustable depending on the type of use (e.g., a sensing angle range of about 35 degrees to 270 degrees or more). In another embodiment of the invention, the Sensors A, B, D and E use an electronic capacity sensor, such as the function used in a "touch lamp." However, this type of sensor is not a "touch free" type of sensor. In one example, the electronic capacity sensor is only used where a non-touch free operation is desired. Other motion type sensors may also be employed in other embodiments of the invention.

In some embodiments of the invention, the maximum hot water temperature is conveniently set based on age of the targeted users. For example, when the faucet is in use in a senior home, a pre-school, etc., the maximum temperature may be set accordingly to prevent injury to those that may be more susceptible to higher water temperatures. In other uses, such as industrial use or commercial use, where the maximum temperature is necessarily higher, a higher maximum temperature may be set accordingly. The maximum temperature setting is therefore set to avoid injuries or to be used for a particular purpose (i.e., commercial, industrial, etc.). It should be noted that in some embodiments of the invention, the water temperature is reset to a default temperature to avoid injury to the next person after a person using the faucet at maximum temperature.

In one embodiment of the invention, the continuous flow mode may run indefinitely once entered into. In one example, the Continue-Flow-Mode will perform same function as somebody opens a manual faucet and lets it flow continuously. In one example, the main purpose of this mode is targeted for residential applications where a basic knowledge about faucet operation principles are known, and not for just commercial usages like a restroom in airport or restaurants.

In one embodiment of the invention, if power to the automatic faucet is interrupted, the flow control valve A (solenoid valve) will shut off (normal close) to shut off water flow in case the power goes out or battery dies.

In some embodiments of the invention, since there is only one water tube and an electronic wire connection from faucet body to the housing of the motorized valve assembly, the installation of the embodiments of the invention are even easier than traditional manual faucets.

In one embodiment of the invention, the left/right sensors are fully reversible or at the same side based on need (e.g., a handicap, left handed vs. right handed, etc.). Additionally, the sensors may be installed in different parts of faucet body depending upon the application and/or need.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for providing touch-free control over the flow of water from a spout including storing parameters for the flow of water without using touch-based controls, the method comprising:

receiving, at an electronic logic processor, a first sensor signal responsive to a first activation motion;

transmitting, from the logic processor, in response to the receipt of the first sensor signal, a first valve signal instructing a water-control valve to cause water to flow from a spout at a first temperature;

receiving, at the logic processor, a second sensor signal responsive to a second activation motion;

transmitting, from the logic processor, in response to the receipt of the second sensor signal, a second valve signal instructing the temperature-control valve to change the temperature of the flowing water to a second temperature;

receiving, at the logic processor, a third sensor signal responsive to a third activation motion, wherein a characteristic of the third sensor signal indicates a period of time associated with the corresponding activation motion of the third sensor signal;

storing data corresponding to the second temperature in an electronic memory, in response to the receipt of the third sensor signal;

receiving, at the logic processor, a fourth sensor signal responsive to a fourth activation motion, wherein a characteristic of the fourth sensor signal indicates a period of time associated with the corresponding activation motion of the fourth sensor signal;

retrieving, from the electronic memory, the data corresponding to the second temperature; and transmitting, from the logic processor, in response to the receipt of the fourth sensor signal, a third valve signal instructing the water-control valve to cause water to flow from the spout at the second temperature, wherein the second temperature is based on the data retrieved from the electronic memory;

wherein each activation motion is related to a presence of an object in front of a touch-free sensor.

2. The method of claim 1:

wherein the first valve signal instructs the water-control valve to cause water to flow from the spout at the first temperature and at a first flow rate; further comprising:
receiving, at the logic processor, a first flow-sensor signal responsive to an activation motion corresponding to changing flow rate of water from the spout;
transmitting, from the logic processor, in response to the receipt of the first flow-sensor signal, a first flow-valve signal instructing the water-control valve to change the flow rate of the flowing water to a second flow rate;
storing data corresponding to the second flow rate in the electronic memory in response to the receipt of the third sensor signal; and
retrieving, from the electronic memory, the data corresponding to the second flow rate; and
wherein the third valve signal further instructs the water-control valve to cause water to flow from the spout at the second flow rate, wherein the second flow rate is based on the data retrieved from the electronic memory.

3. The method of claim 1, further comprising:
receiving, at the logic processor, a fifth sensor signal responsive to a fifth activation motion;
transmitting, from the logic processor, in response to the receipt of the fifth sensor signal, a fourth valve signal instructing the temperature-control valve to change the temperature of the flowing water to a third temperature;
receiving, at the logic processor, a sixth sensor signal responsive to a sixth activation motion;
storing data corresponding to the third temperature in the electronic memory, in response to the receipt of the sixth sensor signal, without replacing the data corresponding to the second temperature stored in the electronic memory;
receiving, at the logic processor, a seventh sensor signal responsive to a seventh activation motion, wherein the seventh sensor signal is received from a touch-free sensor that is not the touch-free sensor associated with the fourth sensor signal;
retrieving, from the electronic memory, the data corresponding to the third temperature; and
transmitting, from the logic processor, in response to the receipt of the seventh sensor signal, a fifth valve signal instructing the water-control valve to cause water to flow from the spout at the third temperature, wherein the third temperature is based on the data retrieved from the electronic memory.

4. The method of claim 3, wherein the logic processor is configured to receive a signal to retrieve the data corresponding to the second temperature stored in the electronic memory, and is configured to receive a separate signal to receive the data corresponding to the third temperature stored in the electronic memory.

5. The method of claim 3, wherein:
the step of receiving, at the logic processor, the first sensor signal comprises receiving the first sensor signal generated from a first touch-free preset setting sensor and the method further comprising associating an electronic representation of a preset mode with a first preset mode in response to receiving the first sensor signal, wherein the first touch-free preset setting sensor is associated with the first preset mode; and
wherein the data corresponding to the second temperature is stored in the electronic memory as being associated with the first preset mode in response to the electronic representation of the preset mode being associated with the first preset mode.

6. The method of claim 1, wherein storing data corresponding to the second temperature in the electronic memory is performed in response to the receipt of the third sensor signal substantially simultaneously with the receipt of a companion sensor signal indicating the presence of an object in front of a touch-free sensor that is located within a hand's width from the sensor associated with the third sensor signal such that the logic processor receives both the third sensor signal and the companion sensor signal in response to the presence of the same object.

7. The method of claim 1, wherein the first sensor signal indicates the presence of an object in front of a touch-free sensor facing a sink basin.

8. The method of claim 1, wherein instructing the water-control valve to cause water to flow from a spout at a first temperature comprises sending a signal to a solenoid valve.

9. The method of claim 1, wherein instructing the temperature-control valve to change the temperature of the flowing water to a second temperature comprises sending a signal to a motorized gear valve.

10. The method of claim 1, wherein the first sensor signal is associated with a different touch-free sensor than the touch-free sensor associated with the second sensor signal.

11. The method of claim 1, wherein the second sensor signal is associated with a different touch-free sensor than the touch-free sensor associated with the third sensor signal.

12. The method of claim 1, wherein the third sensor signal is associated with a different touch-free sensor than the touch-free sensor associated with the fourth sensor signal.

13. The method of claim 1, wherein the touch-free sensor comprises an infrared touch-free sensor.

14. An electronic logic processor configured to provide touch-free control over the flow of water from a spout including storing parameters for the flow of water without using touch-based controls, the logic processor configured to:
receive a first sensor signal responsive to a first activation motion;
transmit, in response to the receipt of the first sensor signal, a first valve signal instructing a water-control valve to cause water to flow from a spout at a first temperature;
receive a second sensor signal responsive to a second activation motion;
transmit, in response to the receipt of the second sensor signal, a second valve signal instructing the temperature-control valve to change the temperature of the flowing water to a second temperature;
receive a third sensor signal responsive to a third activation motion, wherein a characteristic of the third sensor signal indicates a period of time associated with the corresponding activation motion of the third sensor signal;
store data corresponding to the second temperature in an electronic memory, in response to the receipt of the third sensor signal;
receive a fourth sensor signal responsive to a fourth activation motion, wherein a characteristic of the fourth sensor signal indicates a period of time associated with the corresponding activation motion of the fourth sensor signal;

retrieve, from the electronic memory, the data corresponding to the second temperature; and transmit, in response to the receipt of the fourth sensor signal, a third valve signal instructing the water-control valve to cause water to flow from the spout at the second temperature, wherein the second temperature is based on the data retrieved from the electronic memory wherein each activation motion is related to a presence of an object in front of a touch-free sensor.

15. The logic processor of claim 14:

wherein the first valve signal instructs the water-control valve to cause water to flow from the spout at the first temperature and at a first flow rate; the logic processor further configured to:

receive a first flow-sensor signal responsive to an activation motion corresponding to changing flow rate of water from the spout;

transmit, in response to the receipt of the first flow-sensor signal, a first flow-valve signal instructing the water-control valve to change the flow rate of the flowing water to a second flow rate;

store data corresponding to the second flow rate in the electronic memory in response to the receipt of the third sensor signal; and retrieve, from the electronic memory, the data corresponding to the second flow rate; and wherein the third valve signal further instructs the water-control valve to cause water to flow from the spout at the second flow rate, wherein the second flow rate is based on the data retrieved from the electronic memory.

16. The logic processor of claim 14, further configured to:

receive a fifth sensor signal responsive to a fifth activation motion;

transmit, in response to the receipt of the fifth sensor signal, a fourth valve signal instructing the temperature-control valve to change the temperature of the flowing water to a third temperature;

receive a sixth sensor signal responsive to a sixth activation motion;

store data corresponding to the third temperature in the electronic memory, in response to the receipt of the sixth sensor signal, without replacing the data corresponding to the second temperature stored in the electronic memory;

receive a seventh sensor signal responsive to a seventh activation motion, wherein the seventh sensor signal is received from a touch-free sensor that is not the touch-free sensor associated with the fourth sensor signal;

retrieve, from the electronic memory, the data corresponding to the third temperature; and transmit, in response to the receipt of the seventh sensor signal, a fifth valve signal instructing the water-control valve to cause water to flow from the spout at the third temperature, wherein the third temperature is based on the data retrieved from the electronic memory.

17. The logic processor of claim 16, further configured to receive a signal to retrieve the data corresponding to the second temperature stored in the electronic memory, and is configured to receive a separate signal to receive the data corresponding to the third temperature stored in the electronic memory.

18. The logic processor of claim 16, wherein the logic processor is further configured to:

receive the first sensor signal from a first touch-free preset setting sensor;

associate an electronic representation of a preset mode with a first preset mode in response to receiving the first sensor signal indicating the presence of an object in front of a first touch-free preset setting sensor, wherein the first touch-free preset setting sensor is associated with the first preset mode; and store the data corresponding to the second temperature in the electronic memory as being associated with the first preset mode in response to the electronic representation of the preset mode being associated with the first preset mode.

19. The logic processor of claim 14, wherein the logic processor is configured to store data corresponding to the second temperature in the electronic memory in response to the receipt of the third sensor signal substantially simultaneously with the receipt of a companion sensor signal indicating the presence of an object in front of a touch-free sensor that located within a hand's width from the sensor associated with the third sensor signal such that the logic processor is configured to receive both the third sensor signal and the companion sensor signal in response to the presence of the same object.

20. The logic processor of claim 14, wherein the first sensor signal is associated with a touch-free sensor facing a sink basin.

21. The logic processor of claim 14, wherein the logic processor is configured to instruct the water-control valve to cause water to flow from a spout at a first temperature by sending a signal to a solenoid valve.

22. The logic processor of claim 14, wherein the logic processor is configured to instruct the temperature-control valve to change the temperature of the flowing water to a second temperature by sending a signal to a motorized gear valve.

23. The logic processor of claim 14, wherein the first sensor signal is associated with a different touch-free sensor than the touch-free sensor associated with the second sensor signal.

24. The logic processor of claim 14, wherein the second sensor signal is associated with a different touch-free sensor than the touch-free sensor associated with the third sensor signal.

25. The logic processor of claim 14, wherein the third sensor signal is associated with a different touch-free sensor than the touch-free sensor associated with the fourth sensor signal.

26. The logic processor of claim 14, wherein the touch-free sensor comprises an infrared touch-free sensor.

* * * * *